(12) United States Patent
Yasui et al.

(10) Patent No.: US 6,367,245 B1
(45) Date of Patent: Apr. 9, 2002

(54) METHOD OF EVALUATING DETERIORATED STATE OF EXHAUST GAS ADSORBENT

(75) Inventors: Yuji Yasui; Tetsuo Endo; Tadashi Sato; Shiro Takakura, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/654,157

(22) Filed: Sep. 1, 2000

(30) Foreign Application Priority Data

Sep. 3, 1999 (JP) .......................................... 11-249475

(51) Int. Cl.$^7$ ................................................ F01N 3/00
(52) U.S. Cl. .......................... 60/277; 60/276; 60/278; 60/292; 60/297
(58) Field of Search ........................ 60/276, 277, 278, 60/284, 292, 297, 299, 287

(56) References Cited

U.S. PATENT DOCUMENTS

| 5,467,594 A | * | 11/1995 | Aoki et al. ................... 60/276 |
| 5,524,433 A | * | 6/1996 | Adamczyk et al. ............ 60/276 |
| 5,647,206 A | * | 7/1997 | Yamamoto et al. ............ 60/297 |
| 5,946,906 A | * | 9/1999 | Akazaki et al. ................ 60/278 |
| 6,182,445 B1 | * | 2/2000 | Yamazaki et al. ............. 60/277 |
| 6,145,304 A | * | 11/2000 | Takahashi et al. ............. 60/277 |
| 6,158,212 A | * | 12/2000 | Tanaka ......................... 60/277 |

* cited by examiner

*Primary Examiner*—Thomas Denion
*Assistant Examiner*—Binh Tran
(74) *Attorney, Agent, or Firm*—Arent Fox Kintner Plotkin & Kahn, PLLC

(57) ABSTRACT

Exhaust gas sensors or air-fuel ratio sensors for generating outputs depending on the concentration of HC are disposed respectively upstream and downstream of an HC adsorbent in an exhaust passage. When an exhaust gas emitted from an internal combustion engine is supplied to the exhaust passage to allow the HC adsorbent to adsorb HC in the exhaust gas, an amount of HC adsorbed by the HC adsorbent per unit time is determined based on the difference between outputs from the exhaust gas sensors. A deteriorated state of the HC adsorbent is evaluated by comparing the determined adsorbed amount of HC and its integrated value with a threshold set depending on a temperature or the like of the HC adsorbent.

23 Claims, 14 Drawing Sheets

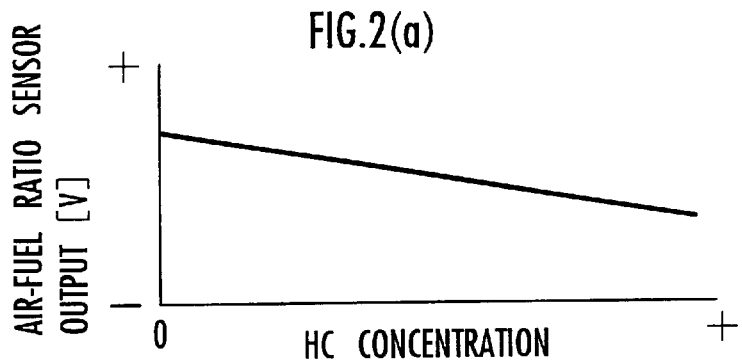
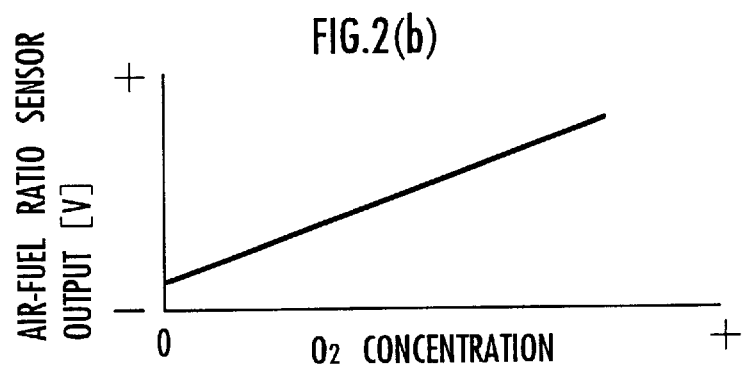
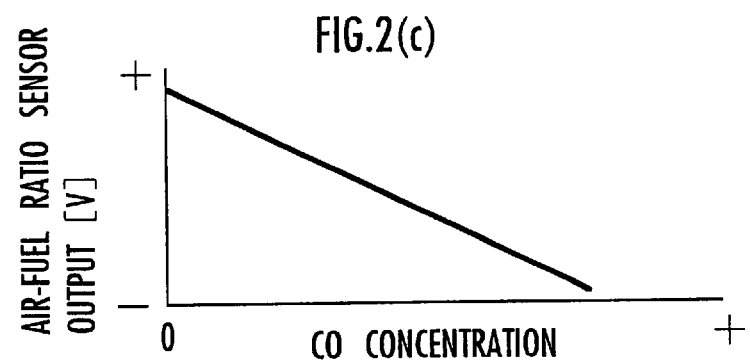
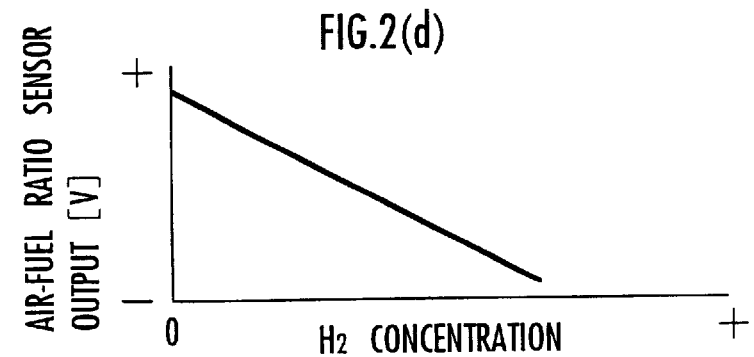

METHOD OF EVALUATING DETERIORATED STATE OF EXHAUST GAS ADSORBENT

BACKGROUND OF THE INVENTION

1. Field of the Invention

The present invention relates to a method of evaluating a deteriorated state of an exhaust gas adsorbent for adsorbing an exhaust gas emitted from an internal combustion engine.

2. Description of the Related Art

Exhaust gas purifying systems for internal combustion engines generally have a three-way catalytic converter disposed in the exhaust passage of an internal combustion engine for removing unburned components including HC (hydrocarbon), NOx (nitrogen oxides), and CO (carbon oxide) from the exhaust gas emitted from the internal combustion engine.

Generally, the catalytic converters are not activated unless their temperature reaches a certain level, and do not perform an intended exhaust gas purifying function while they are being inactivated at low temperatures. Therefore, the exhaust gas purifying systems for internal combustion engines are required to increase its exhaust gas purifying capability at temperatures where the exhaust gas purifying function of the catalytic converter is not fully performed, e.g., immediately after the internal combustion engine has started up when the internal combustion engine and the catalytic converter are cold.

To meet the above requirement, there has been proposed an exhaust gas purifying systems having a catalytic converter and also an exhaust gas adsorbent for adsorbing a particular gas component, e.g., HC, of the exhaust gas, disposed in the exhaust passage of an internal combustion engine, as disclosed in Japanese laid-open patent publications Nos. 8-93458 and 8-218850, for example.

In the proposed exhaust gas purifying system, an exhaust passage downstream of the catalytic converter is divided into two exhaust passages, one of which (hereinafter referred to as "auxiliary exhaust passage") houses the exhaust gas adsorbent for adsorbing HC therein. The auxiliary exhaust passage with the auxiliary exhaust passage housed therein is joined to the other exhaust passage (hereinafter referred to as "main exhaust passage") downstream of the exhaust gas adsorbent. The joint between the auxiliary and main exhaust passages is associated with a switching valve which selectively vents one of the auxiliary and main exhaust passages to the atmosphere and closes the other exhaust passage from the atmosphere. The auxiliary exhaust passage is connected to an exhaust passage upstream of the catalytic converter via a recirculation path with an on/off valve from a location downstream of the exhaust gas adsorbent and upstream of the switching valve.

The exhaust gas adsorbent comprises zeolite or the like, and has such characteristics that it adsorbs HC when its temperature is relatively low and desorbs the adsorbed HC when its temperature rises.

The exhaust gas purifying system operates as follows: In a period (hereinafter referred to as "absorption period") after the internal combustion engine has started up until the temperature of the exhaust gas adsorbent and the temperature of the exhaust gas or the time elapsed after the internal combustion engine has started up exceeds a predetermined value, the on/off valve in the recirculation path is closed and the auxiliary exhaust passage is vented to the atmosphere and the main exhaust passage is shut off from the atmosphere by the switching valve, so that the exhaust gas emitted from the internal combustion engine is discharged through the catalytic converter and the exhaust gas adsorbent, i.e., HC adsorbent, into the atmosphere. Immediately after the internal combustion engine has started up, the catalytic converter is unable to sufficiently remove HC from the exhaust gas because the catalytic converter is cold. However, since the exhaust gas adsorbent that adsorbs HC at a relatively low temperature is also cold, while the exhaust gas having passed through the catalytic converter is passing through the auxiliary exhaust passage, the exhaust gas adsorbent absorbs HC in the exhaust gas and hence removes HC from the exhaust gas.

In a subsequent period (hereinafter referred to as "desorption period") after the adsorption period is ended until the temperature of the exhaust gas adsorbent and the temperature of the exhaust gas or the time elapsed after the internal combustion engine has started up exceeds a predetermined value, the main exhaust passage is vented to the atmosphere and the auxiliary exhaust passage is shut off from the atmosphere by the switching valve, and the on/off valve in the recirculation path is opened, so that a portion of the exhaust gas emitted from the internal combustion engine is recirculated via the auxiliary exhaust passage and the recirculation path to the exhaust passage upstream of the catalytic converter, and the exhaust gas is discharged through the catalytic converter into the atmosphere. As the exhaust gas supplied to the auxiliary exhaust passage is recirculated to the exhaust passage upstream of the catalytic converter, the HC adsorbed by the exhaust gas adsorbent in the adsorption period is desorbed from the exhaust gas adsorbent and supplied to the catalytic converter. The HC supplied to the catalytic converter is removed by the catalytic converter which has been increased in temperature and activated in the adsorption period.

The exhaust gas purifying system is thus capable of purifying the exhaust gas while the catalytic converter is being inactivated.

The exhaust gas adsorbent for adsorbing a particular gas component, e.g., HC, of the exhaust gas is deteriorated due to aging, and will not be able to sufficiently adsorb the particular gas component if it is deteriorated to a certain degree. The exhaust gas adsorbent thus deteriorated is unable to perform the desired exhaust gas purifying capability. It is therefore desirable evaluate a deteriorated state of the exhaust gas adsorbent according to some process so that the exhaust gas adsorbent can be replaced when it is deteriorated to some extent.

One proposal for evaluating a deteriorated state of the exhaust gas adsorbent is disclosed in Japanese laid-open patent publication No. 8-218850, for example.

According to the disclosed proposal, exhaust gas sensors for generating an output depending on the concentration of HC adsorbed by the exhaust gas adsorbent, e.g., an $O_2$ sensor (oxygen concentration sensor), an air-fuel ratio sensor, an HC sensor, etc., are disposed upstream and downstream of the exhaust gas adsorbent. A time required until the output from the downstream exhaust gas sensor becomes equal to the output from the upstream exhaust gas sensor is measured in the desorption period after the adsorption period. While the HC is being desorbed from the exhaust gas adsorbent, since the HC concentration downstream of the exhaust gas adsorbent is higher than the HC concentration upstream of the exhaust gas adsorbent, the output from the downstream exhaust gas sensor is greater than the output from the upstream exhaust gas sensor.

If the measured time does not fall in a predetermined range, then it is determined that the exhaust gas adsorbing system suffers a failure, e.g., the exhaust gas adsorbent is deteriorated, the exhaust gas leaks from the switching valve, etc.

In order to evaluate a deteriorated state of the exhaust gas adsorbent, however, the above proposed process is based on the assumption that the time measured in the desorption period remains substantially constant insofar as the exhaust gas adsorbent is not deteriorated. The assumption means that insofar as the exhaust gas adsorbent is not deteriorated, the total amount of HC adsorbed by the exhaust gas adsorbent in the adsorption period remains substantially the same, and the absorbed HC is desorbed from the exhaust gas adsorbent at substantially the same rate in the desorption period.

The amount of HC adsorbed by the exhaust gas adsorbent in the adsorption period and the rate at which the absorbed HC is desorbed from the exhaust gas adsorbent in the desorption period are affected by the rate of the exhaust gas supplied to the auxiliary exhaust passage with the auxiliary exhaust passage housed therein. According to the process disclosed in Japanese laid-open patent publication No. 8-218850, the above assumptions may not often be true depending on the operating state of the internal combustion engine immediately after it has started up. The deteriorated state of the exhaust gas adsorbent cannot properly be evaluated if the above assumptions are no longer applicable.

In Japanese laid-open patent publication No. 8-218850, the exhaust gas sensors, e.g., an $O_2$ sensor, an air-fuel ratio sensor, an HC sensor, etc., which are disposed upstream and downstream of the exhaust gas adsorbent, are sensitive to various exhaust gas components, e.g., CO, $H_2$, $O_2$, etc., other than HC adsorbed by the exhaust gas adsorbent. According to the process disclosed in Japanese laid-open patent publication No. 8-218850, if the exhaust gas components other than HC in the exhaust gas varies, then it is frequently impossible to properly obtain the time required until the output from the downstream exhaust gas sensor becomes equal to the output from the upstream exhaust gas sensor, i.e., a parameter to evaluate a deteriorated state of the exhaust gas adsorbent.

Japanese laid-open patent publication No. 8-93458 discloses another process of evaluating a deteriorated state of the exhaust gas adsorbent with an HC sensor.

According to the discloses process, the HC sensor is disposed downstream of the exhaust gas adsorbent, and it is determined that the exhaust gas adsorbent is deteriorated if the HC concentration detected by the HC sensor is lower than a predetermined value in the absorption period and the desorption period, or alternatively it is determined that the exhaust gas adsorbent is deteriorated if the total amount of HC, produced when the product of the HC concentration detected by the HC sensor and the rate of the exhaust gas is integrated with respect to time in the desorption period is lower than a predetermined value in the desorption period.

However, because the HC sensor is also sensitive to exhaust gas components other than HC, it is generally difficult to properly detect the HC concentration at a location where the HC sensor is positioned, i.e., downstream of the exhaust gas adsorbent, from the output of the HC sensor. Consequently, it is difficult to obtain an appropriate evaluation of a deteriorated state of the exhaust gas adsorbent based on the HC concentration detected by the HC sensor.

SUMMARY OF THE INVENTION

It is therefore an object of the present invention to provide a method of accurately and appropriately evaluating a deteriorated state of an exhaust gas adsorbent which absorbs a particular component, e.g., HC, of an exhaust gas, specifically an exhaust gas adsorbent which operates alternatively in an adsorption mode for adsorbing a particular component of an exhaust gas and a desorption mode for desorbing the adsorbed component depending on an environmental condition such as temperature or the like.

According to the findings by the inventors of the present invention, exhaust gas sensors for generating respective outputs depending on the concentration of a particular component of an exhaust gas that is adsorbed by an exhaust gas adsorbent are disposed upstream and downstream, respectively, of the exhaust gas adsorbent in an exhaust passage which is supplied with the exhaust gas from an internal combustion engine, and the outputs generated by the exhaust gas sensors are affected by not only the concentration of the particular component in the exhaust gas at the exhaust gas sensors, but also the concentrations of other gas components. However, when the outputs generated by the exhaust gas sensors are sampled while the exhaust gas from the internal combustion engine is being supplied to the exhaust passage with the exhaust gas adsorbent disposed therein in an adsorption mode of the exhaust gas adsorbent, and the difference between the outputs generated by the exhaust gas sensors are observed, the difference is strongly correlated to the amount of the particular component, specifically the amount of the particular component per unit time, that is adsorbed by the exhaust gas adsorbent from instant to instant. The reason appears to be that basically, the concentration of only the particular component adsorbed by the exhaust gas adsorbent changes between a location upstream of the exhaust gas adsorbent and a location downstream of the exhaust gas adsorbent. Therefore, the amount of the particular component which has been adsorbed by the exhaust gas adsorbent per unit time can be determined on the basis of the difference between the outputs generated by the exhaust gas sensors while the exhaust gas from the internal combustion engine is being supplied to the exhaust passage and the particular component is being adsorbed by the exhaust gas sensors.

Since a deteriorated state of the exhaust gas adsorbent is a state in which the amount of the particular component that can be adsorbed by the exhaust gas adsorbent is smaller than the amount of the particular component that can be adsorbed when the exhaust gas adsorbent is brand new, the deterioration of the exhaust gas adsorbent is directly reflected in the adsorbed amount of the particular component thus determined.

Consequently, when the amount of the particular component adsorbed by the exhaust gas adsorbent is determined from the difference between the outputs generated by the exhaust gas sensors, a deteriorated state of the exhaust gas adsorbent can appropriately be evaluated.

According to an aspect of the present invention, there is provided a method of evaluating a deteriorated state of an exhaust gas adsorbent disposed in an exhaust passage supplied with an exhaust gas emitted from an internal combustion engine, said exhaust gas adsorbent being operable alternatively in an adsorption mode for adsorbing a particular component of the exhaust gas and a desorption mode for desorbing the adsorbed component depending on an environmental condition at the time said exhaust gas is supplied to the exhaust passage, comprising the steps of providing a first exhaust gas sensor and a second exhaust gas sensor for generating respective outputs depending on the concentration of said particular component, respectively upstream and downstream of said exhaust gas adsorbent, adsorbing said particular component with said exhaust gas adsorbent in said adsorption mode while supplying the exhaust gas from said internal combustion engine to said exhaust passage, calculating an amount of said particular component which has been adsorbed by said exhaust gas adsorbent per unit time, based on the difference between the outputs of said first and second exhaust gas sensors which is obtained while said particular component is being adsorbed by said exhaust gas adsorbent, and evaluating a deteriorated state of said exhaust gas adsorbent using the calculated adsorbed amount of said particular component.

In the above method, since an amount of said particular component which has been adsorbed by said exhaust gas adsorbent per unit time is calculated based on the difference between the outputs of said first and second exhaust gas sensors which is obtained while said particular component is being adsorbed by said exhaust gas adsorbent, the adsorbed amount of said particular component can accurately be determined without being essentially affected by exhaust gas components other than the particular component. Using the adsorbed amount of said particular component thus determined, a deteriorated state of said exhaust gas adsorbent can appropriately be evaluated.

The environmental condition mentioned above refers to a temperature of the exhaust gas adsorbent, for example. The particular component in the exhaust gas that is adsorbed by the exhaust gas adsorbent may be HC, NOx, or the like. If the particular component is HC, then the exhaust gas adsorbent comprises a zeolite-based adsorbent. The exhaust gas adsorbent of this type operates in an adsorption mode for adsorbing HC and a desorption mode for desorbing HC depending on the temperature of the exhaust gas adsorbent. If the particular component is NOx, then the exhaust gas adsorbent comprises an alkaline-metal-based adsorbent or alkaline-earch-based adsorbent. The exhaust gas adsorbent of this type operates in an adsorption mode for adsorbing HC and a desorption mode for desorbing NOx depending on the air-fuel ratio of the exhaust gas.

If the particular component is HC, then each of the first and second exhaust gas sensors for generating outputs depending on the concentration of HC may comprise an $O_2$ sensor, an air-fuel ratio sensor, an HC sensor, or the like. The first and second exhaust gas sensors may be one of these sensor types. If the particular component is NOx, then each of the first and second exhaust gas sensors may comprise an $O_2$ sensor, an air-fuel ratio sensor, an NOx sensor, or the like.

The particular component should preferably be adsorbed in a predetermined period immediately after the internal combustion engine has started to operate. Specifically, the particular component should be adsorbed from the start of operation of the internal combustion engine until the adsorbed amount of the particular component which has been calculated drops below a predetermined amount, i.e., becomes substantially nil, or until a predetermined time has elapsed from the start of operation of the internal combustion engine.

The step of calculating the adsorbed amount of said particular component preferably comprises the step of converting the difference between the outputs of said first and second exhaust gas sensors depending on a flow rate of the exhaust gas flowing in said exhaust passage when the outputs of said first and second exhaust gas sensors are obtained, and a temperature of said exhaust gas, for thereby determining the adsorbed amount of said particular component.

Specifically, inasmuch as the difference between the outputs of said first and second exhaust gas sensors corresponds to the concentration of the particular component that is adsorbed by the exhaust gas adsorbent, the amount of the particular component that is adsorbed by the exhaust gas adsorbent per unit time is affected by the flow rate of the exhaust gas at the time the outputs of said first and second exhaust gas sensors are acquired. The density of the particular component in the exhaust gas is affected by the temperature of the exhaust gas. In view of these considerations, the difference between the outputs of said first and second exhaust gas sensors is converted depending on the flow rate of the exhaust gas and the temperature of the exhaust gas thereby to determine the adsorbed amount of the particular component. Therefore, the adsorbed amount of the particular component can be determined with high accuracy.

The difference between the outputs of said first and second exhaust gas sensors may be converted by multiplying the difference by the flow rate of the exhaust gas supplied to the exhaust passage and a predetermined corrective coefficient depending on the temperature of the exhaust gas, using a predetermined data table.

According to the present invention, a deteriorated state of the exhaust gas adsorbent is evaluated, using the adsorbed amount of the particular component, as follows:

According to one process (hereinafter referred to as "first evaluating process"), the calculated adsorbed amount of said particular component is compared with a predetermined threshold to evaluate a deteriorated state of said exhaust gas adsorbent.

Specifically, when the exhaust gas adsorbent is deteriorated, the calculated adsorbed amount of said particular component, i.e., the adsorbed amount per unit time, becomes smaller than when the exhaust gas adsorbent is normal. Therefore, a deteriorated state of said exhaust gas adsorbent can be evaluated by comparing the adsorbed amount of said particular component with a predetermined threshold.

According to another process (hereinafter referred to as "second evaluating process"), the adsorbed amount of said particular component is successively determined while said step of calculating an adsorbed amount of said particular component is being carried out, and said step of evaluating a deteriorated state of said exhaust gas adsorbent comprises the steps of measuring an elapsed time required from the start of said step of adsorbing said particular component until said successively determined adsorbed amount of said particular component drops to or below a predetermined amount, and comparing the measured elapsed time with a predetermined threshold thereby to evaluate a deteriorated state of said exhaust gas adsorbent.

Specifically, there is a certain limitation on the amount of the particular component that can be adsorbed by the exhaust gas adsorbent. When the exhaust gas adsorbent becomes nearly saturated as a result of adsorbing the particular component, the amount of the particular component that is adsorbed by the exhaust gas adsorbent per unit time becomes small. Furthermore, the total amount of the particular component that can be adsorbed by the exhaust gas adsorbent after the start of the step of adsorbing the particular component until the exhaust gas adsorbent becomes saturated is smaller when the exhaust gas adsorbent is deteriorated than when the exhaust gas adsorbent is normal. Consequently, if the elapsed time required from the start of said step of adsorbing said particular component until said successively determined adsorbed amount of said particular component drops to or below a predetermined amount, e.g., becomes substantially nil, as the exhaust gas adsorbent becomes nearly saturated, is measured, then the measured time becomes shorter when the exhaust gas adsorbent is deteriorated than when the exhaust gas adsorbent is normal. By comparing the measured time with a predetermined threshold, therefore, a deteriorated state of said exhaust gas adsorbent can appropriately be evaluated.

According to still another process (hereinafter referred to as "third evaluating process"), the adsorbed amount of said particular component is successively determined while said step of calculating an adsorbed amount of said particular component is being carried out, and said step of evaluating a deteriorated state of said exhaust gas adsorbent comprises the steps of integrating said calculated adsorbed amount for a predetermined period while said step of adsorbing said particular component is being carried out, thereby to determine an integrated adsorbed amount of said particular component adsorbed by said exhaust gas adsorbent in said predetermined period, and comparing said integrated adsorbed amount with a predetermined threshold thereby to evaluate a deteriorated state of said exhaust gas adsorbent.

Specifically, as described above, the amount of the particular component that is adsorbed by the exhaust gas adsorbent per unit time becomes small when the exhaust gas adsorbent is deteriorated. When the adsorbed amount of the particular component is integrated for a predetermined period while said step of adsorbing said particular component is being carried out, thereby to determine an integrated adsorbed amount of said particular component, which represents the total amount of the particular component that is adsorbed by the exhaust gas adsorbent for the predetermined period, the integrated adsorbed amount of said particular component is smaller when the exhaust gas adsorbent is deteriorated than when the exhaust gas adsorbent is normal. By comparing the integrated adsorbed amount with a predetermined threshold, therefore, a deteriorated state of said exhaust gas adsorbent can appropriately be evaluated.

The predetermined period preferably comprises a period in which said adsorbed amount calculated from the start of said step of adsorbing said particular component drops to or below a predetermined amount, or a period in which a predetermined time elapses from the start of said step of adsorbing said particular component. The predetermined period may be the same as the period in which the step of adsorbing the particular component is carried out.

After the step of adsorbing said particular component has been carried out to cause the exhaust gas adsorbent to adsorb the particular component for a predetermined period, all the adsorbed particular component is desorbed from the exhaust gas adsorbent while the exhaust gas is being supplied to the exhaust passage in the desorption mode of the exhaust gas adsorbent. At this time, the total amount of the particular component desorbed from the exhaust gas adsorbent is basically considered to be equal to the total amount of the particular component that has been adsorbed by the exhaust gas adsorbent. While the particular component is being desorbed from the exhaust gas adsorbent, the difference between the outputs of said first and second exhaust gas sensors corresponds to the amount of the particular component desorbed from the exhaust gas adsorbent per unit time. Therefore, the amount of the particular component that has been desorbed by the exhaust gas adsorbent can be determined based on the difference between the outputs of said first and second exhaust gas sensors. By successively determining and integrating the amount of the particular component desorbed by the exhaust gas adsorbent, the total amount of the particular component desorbed from the exhaust gas adsorbent can be recognized. Stated otherwise, the total amount of the particular component that has been adsorbed by the exhaust gas adsorbent can indirectly be recognized from the integrated value of the desorbed amount of the particular component.

According to another aspect of the present invention, there is provided a method of evaluating a deteriorated state of an exhaust gas adsorbent disposed in an exhaust passage supplied with an exhaust gas emitted from an internal combustion engine, said exhaust gas adsorbent being operable alternatively in an adsorption mode for adsorbing a particular component of the exhaust gas and a desorption mode for desorbing the adsorbed component depending on an environmental condition at the time said exhaust gas is supplied to the exhaust passage, comprising the steps of providing a first exhaust gas sensor and a second exhaust gas sensor for generating respective outputs depending on the concentration of said particular component, respectively upstream and downstream of said exhaust gas adsorbent, adsorbing said particular component with said exhaust gas adsorbent in said adsorption mode while supplying the exhaust gas from said internal combustion engine to said exhaust passage for a predetermined period, thereafter, desorbing said particular component from said exhaust gas adsorbent in said desorption mode while supplying the exhaust gas from said internal combustion engine to said exhaust passage, successively calculating an amount of said particular component which has been desorbed from said exhaust gas adsorbent per unit time, based on the difference between the outputs of said first and second exhaust gas sensors which is obtained while said particular component is being desorbed from said exhaust gas adsorbent, integrating the desorbed amount of said particular component from the start of said step of desorbing said particular component from said exhaust gas adsorbent until the calculated desorbed amount of said particular component becomes substantially nil, thereby to determine an integrated desorbed amount of said particular component desorbed from said exhaust gas adsorbent in said step of desorbing said particular component, and comparing said integrated desorbed amount with a predetermined threshold thereby to evaluate a deteriorated state of said exhaust gas adsorbent.

In the above method, the integrated desorbed amount of said particular component is obtained by integrating the desorbed amount of said particular component from the start of said step of desorbing said particular component from said exhaust gas adsorbent until the calculated desorbed amount of said particular component becomes substantially nil, i.e., until the desorption of the particular component from the exhaust gas adsorbent is completed. Therefore, the integrated desorbed amount of said particular component represents the total amount of the particular component that has been adsorbed by the exhaust gas adsorbent in the period in which the step of adsorbing said particular component is carried out, and corresponds to the integrated adsorbed amount of said particular component in the third evaluating process. Because the desorbed amount of said particular component can accurately be determined based on the difference between the outputs of the first and second exhaust gas sensors, the integrated desorbed amount of said particular component can also be obtained with accuracy. As with the integrated adsorbed amount of said particular component in the third evaluating process, the integrated desorbed amount of said particular component becomes smaller when the exhaust gas adsorbent is deteriorated than when the exhaust gas adsorbent is normal. Thus, a deteriorated state of the exhaust gas adsorbent can appropriately be evaluated by comparing the integrated desorbed amount of said particular component with a predetermined threshold. The above process of evaluating a deteriorated state of the exhaust gas adsorbent based on the integrated desorbed amount of said particular component is referred to as "fourth evaluating process".

In the fourth evaluating process, the step of calculating the desorbed amount of said particular preferably comprises the step of converting the difference between the outputs of said first and second exhaust gas sensors depending on a flow rate of the exhaust gas flowing in said exhaust passage when the outputs of said first and second exhaust gas sensors are obtained, and a temperature of said exhaust gas, e.g., multiplying the difference by a corrective coefficient determined depending on the flow rate of the exhaust gas and the temperature of the exhaust gas, for thereby determining the desorbed amount of said particular component. In this manner, the desorbed amount of said particular component can accurately be determined.

In the first through fourth evaluating processes, the predetermined threshold preferably is set depending on at least a temperature of said exhaust gas adsorbent.

Specifically, the amount of the particular component that is adsorbed by the exhaust gas adsorbent in the step of adsorbing the particular component generally varies depending on the temperature of the exhaust gas adsorbent. For example, a zeolite-based exhaust gas adsorbent for adsorbing HC tends to adsorb more HC as the temperature of the exhaust gas adsorbent is lower.

By setting the predetermined threshold depending on the temperature of said exhaust gas adsorbent, a deteriorated state of the exhaust gas adsorbent can more appropriately be evaluated.

The present invention is based on the assumption that the concentrations of exhaust gas components other than the particular component adsorbed by or desorbed from the exhaust gas adsorbent remain unchanged upstream and downstream of the exhaust gas adsorbent. However, the above assumption may not apply due to delay characteristics of the exhaust gas adsorbent and the effect of disturbance. If the above assumption is not applicable, then the difference between the outputs of the first and second exhaust gas sensors tends to contain an error, and hence the accuracy of the adsorbed amount and the desorbed amount that are determined based on the difference is lowered.

According to the present invention, a model which expresses the output per predetermined control cycle of said second exhaust gas sensor is constructed with a plurality of time-series data in a previous control cycle of the output of said first exhaust gas sensor, coefficient parameters relative to the time-series data, respectively, of said first exhaust gas sensor, and a monomial parameter independent of the time-series data of said first exhaust gas sensor. The method which determines the amount of the particular component adsorbed by the exhaust gas adsorbent per unit time further comprises the steps of successively identifying values of said coefficient parameters and said monomial parameter based on the outputs of said first and second exhaust gas sensors while said step of adsorbing said particular component is being carried out, and successively estimating the output of said second exhaust gas sensor using the identified values of said coefficient parameters and said monomial parameter based on said model, the step of calculating the adsorbed amount of said particular component comprising the step of determining said adsorbed amount using the difference between the output of said first exhaust gas sensor and the estimated output of said second exhaust gas sensor instead of the difference between the outputs of said first and second exhaust gas sensors.

The method which determines the amount of the particular component desorbed from the exhaust gas adsorbent per unit time further comprises the steps of successively identifying values of said coefficient parameters and said monomial parameter based on the outputs of said first and second exhaust gas sensors while said step of adsorbing said particular component is being carried out, and successively estimating the output of said second exhaust gas sensor using the identified values of said coefficient parameters and said monomial parameter based on said model, said step of calculating the desorbed amount of said particular component comprising the step of determining said desorbed amount using the difference between the output of said first exhaust gas sensor and the estimated output of said second exhaust gas sensor instead of the difference between the outputs of said first and second exhaust gas sensors.

As described above, while values of said coefficient parameters and said monomial parameter are being successively identified based on the outputs of said first and second exhaust gas sensors while said step of adsorbing or desorbing said particular component is being carried out, the output of said second exhaust gas sensor is successively estimated using the identified values of said coefficient parameters and said monomial parameter based on said model. According to the findings by the inventors, the difference between the output of said first exhaust gas sensor and the estimated output of said second exhaust gas sensor is free of an error that is contained in the difference between the outputs of said first and second exhaust gas sensors.

By using difference between the output of said first exhaust gas sensor and the estimated output of said second exhaust gas sensor instead of the difference between the outputs of said first and second exhaust gas sensors for calculating the adsorbed amount of the particular component and the desorbed amount of the particular component, the adsorbed amount of the particular component and the desorbed amount of the particular component can accurately be determined. Using the adsorbed amount of the particular component and the desorbed amount of the particular component thus determined, a deteriorated state of the exhaust gas adsorbent can more accurately be evaluated according to either one of the first through fourth evaluating processes.

If the outputs in each control cycle of the first and second exhaust gas sensors are represented by VS1 (k), VS2 (k) (k represents the ordinal number of a control cycle), then the above model is expressed by the following equation (1):

$$VS2\ (k) = a1 \cdot VS1\ (k) + \ldots + am \cdot VS1\ (k-m+1) + b1 \qquad (1)$$

where m represents a natural number of 2 or more (e.g., m=4), a1, . . . , am represent the coefficient parameters, and b1 represents the monomial parameter.

Preferably, the step of identifying values of said coefficient parameters and said monomial parameter comprises the step of identifying values of said coefficient parameters and said monomial parameter according to an algorithm constructed to minimize an error between the value of the output (corresponding to the estimated output referred to above) of said second exhaust gas sensor which is determined from the time-series data of the output of said first exhaust gas sensor based on said model and the value of the actual output of said second exhaust gas sensor.

By thus identifying the values of the coefficient parameters and said monomial parameter according to the above algorithm, the above error corresponds to the error contained in the difference between the actual outputs of the first and second exhaust gas sensors. When the difference between the actual output of the first exhaust gas sensor and the estimated output of the second exhaust gas sensor based on the model is determined, the determined difference is free from an error contained in the difference between the actual outputs of said first and second exhaust gas sensors. As a result, the adsorbed amount of the particular component and the desorbed amount of the particular component can highly accurately be determined based on the difference between the actual output of the first exhaust gas sensor and the estimated output of the second exhaust gas sensor.

The above algorithm may comprise the algorithm of a method of least squares, a method of weighted least squares, a fixed gain method, a degression method, or the like.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIGS. 2(a) through 2(d) are diagrams showing the output characteristics of exhaust sensors (air-fuel sensors) used in the system shown in FIG. 1;

DETAILED DESCRIPTION OF THE PREFERRED EMBODIMENT

Figure 1:
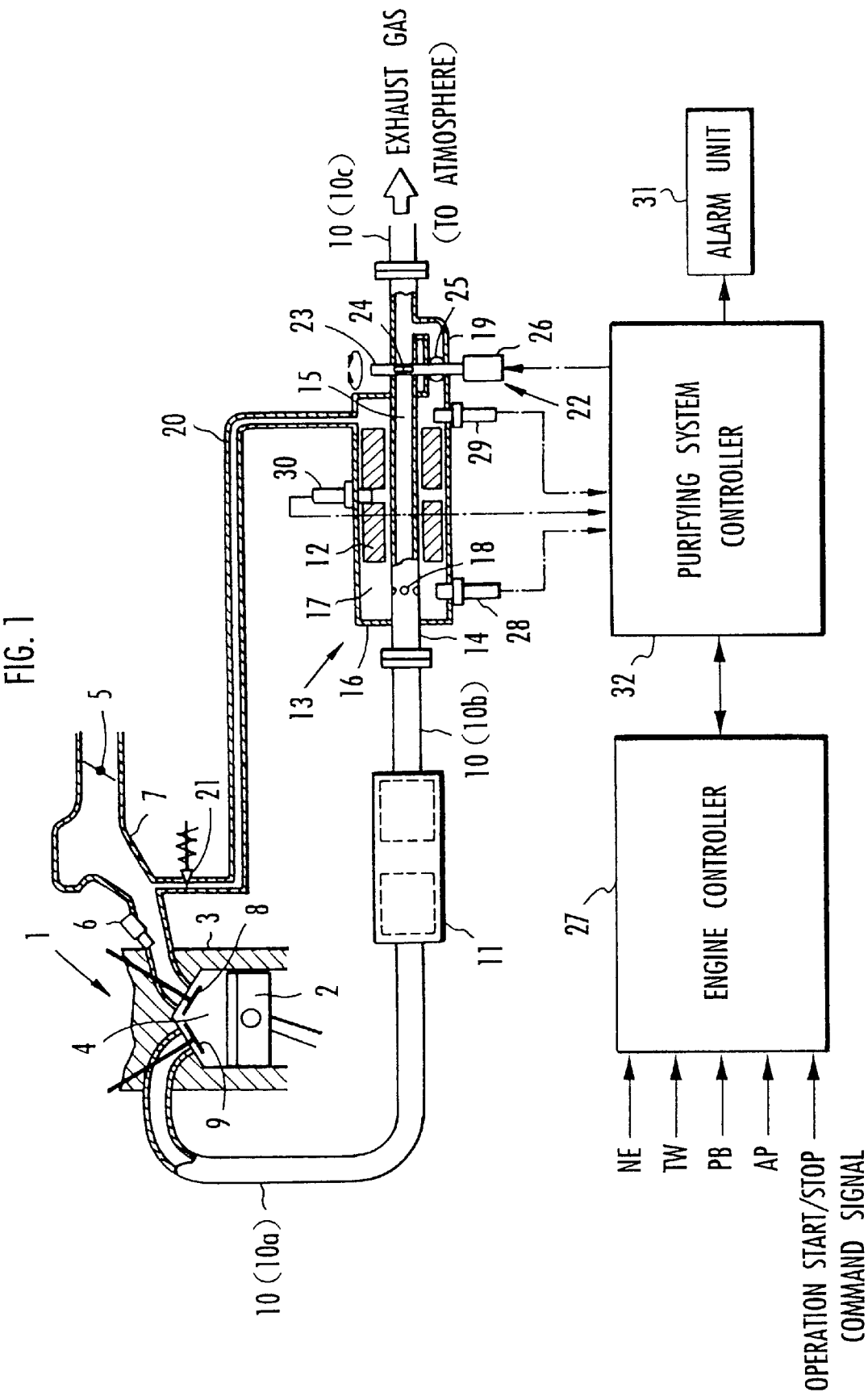
FIG. 1 is a schematic view, partly in block form, of a system for carrying out a method of evaluating a deteriorated state of an exhaust gas adsorbent according to the present invention.

FIG. 1 schematically shows an exhaust gas purifying system for internal combustion engines which is used to carry out a method of evaluating a deteriorated state of an exhaust gas adsorbent according to the present invention.

As shown in FIG. 1, an internal combustion engine 1 has a piston 2 coupled to a crankshaft (not shown) and movably disposed in a cylinder 3 and a combustion chamber 4 defined above the piston 2, just like ordinary internal combustion engines for use on automobiles or the like. An air-fuel mixture is drawn from an intake pipe 7 having a throttle valve 5 and a fuel injector 6 into the combustion chamber 4 via a intake valve 8. The air-fuel mixture introduced into the combustion chamber 4 is ignited by an ignition device (not shown) and combusted. An exhaust gas generated when the air-fuel mixture is combusted is discharged from the combustion chamber 4 via an exhaust valve 9 into an exhaust pipe 10.

While the internal combustion engine 1 is shown as being a single-cylinder internal combustion engine for illustrative purpose, it may be a multiple-cylinder internal combustion engine.

The exhaust gas purifying system for purifying the exhaust gas discharged from the internal combustion engine 1 into the exhaust pipe 10 has a catalytic converter 11 and an exhaust gas adsorption unit 13 having an exhaust gas adsorbent 12 (hereinafter referred to as "HC adsorbent 12") capable of adsorbing HC (hydrocarbon) as a particular component of the exhaust gas. The catalytic converter 11 and the exhaust gas adsorption unit 13 are disposed in the exhaust pipe 10 successively downstream in the order named.

The exhaust pipe 10 is made up of a plurality of pipe sections. The pipe section extending upstream of the catalytic converter 11 is referred to as an upstream exhaust pipe 10a, the pipe section extending between the catalytic converter 11 and the exhaust gas adsorption unit 13 as an intermediate exhaust pipe 10b, and the pipe section extending downstream of the exhaust gas adsorption unit 13 as a downstream exhaust pipe 10c. The downstream exhaust pipe 10c has a downstream end vented to the atmosphere.

The catalytic converter 11 comprises a three-way catalytic converter, and removes a plurality of components including NOx, HC, CO, etc. contained in the exhaust gas that passes through the catalytic converter 11 by way of chemical reactions, i.e., converts the exhaust gas to a harmless gas, as with ordinary catalytic converters.

The exhaust gas adsorption unit 13 has a first exhaust passage 15 defined by an exhaust pipe 14 whose upstream and downstream ends are connected respectively to the intermediate exhaust pipe 10b and the downstream exhaust pipe 10c, and a substantially cylindrical housing 16 mounted on the exhaust pipe 14 in surrounding relationship to an outer circumferential surface of the exhaust pipe 14.

The exhaust pipe 14 extends centrally through the housing 16, and a second exhaust passage 17 of tubular shape is defined between the outer circumferential surface of the exhaust pipe 14 and an inner circumferential surface of the housing 16. The second exhaust passage 17 corresponds to an exhaust passage according to the present invention. The HC adsorbent 12 which is of a tubular shape is disposed in the second exhaust passage 17.

The HC adsorbent 12 is made of a zeolite-based material, and has characteristics based on its temperature as follows: When the temperature of the HC adsorbent 12 is in a relatively low temperature range, e.g., a temperature range equal to or lower than 100° C., the HC adsorbent 12 operates in an adsorption mode to adsorb HC. When the temperature of the HC adsorbent 12 is in a relatively high temperature range, e.g., a temperature range equal to or higher than 150° C., the HC adsorbent 12 operates in a desorption mode to desorb adsorbed HC. The temperature ranges in which the HC adsorbent 12 operates in the adsorption and desorption modes differ depending on the type of zeolite of the HC adsorbent 12 and the type of HC to be adsorbed by the HC adsorbent 12.

The second exhaust passage 17 is branched from the first exhaust passage 15 through a plurality of holes 18 defined in the exhaust pipe 14 within the housing 16 upstream of the HC adsorbent 12. The second exhaust passage 17 is joined to the downstream end of the exhaust pipe 14 by a joint pipe 19 that extends from the housing 16 downstream of the HC adsorbent 12. The second exhaust passage 17 is connected to the intake pipe 7 downstream of the throttle valve 5 by an EGR passage (exhaust gas recirculation passage) 20 extending from the housing 16 downstream of the HC adsorbent 12.

The EGR passage 20 returns the exhaust gas to the intake pipe 7 in order to combust unburned components of the exhaust gas in the combustion chamber 4 under certain conditions while the internal combustion engine 1 is operating. A solenoid-operated on/off valve 21 is mounted in the EGR passage 20 for selectively opening and closing the EGR passage 20.

The exhaust gas adsorption unit 13 has a switching valve mechanism 22 for venting only one of the first exhaust passage 15 and the second exhaust passage 17 to the downstream exhaust pipe 10c, i.e., the atmosphere, and closing the other of the first exhaust passage 15 and the second exhaust passage 17 from the downstream exhaust pipe 10c, i.e., the atmosphere.

The switching valve mechanism 22 is positioned between the housing 16 and the downstream exhaust pipe 10c in a region where the exhaust pipe 14 and the joint pipe 19 extend parallel to each other. The switching valve mechanism 22 comprises a rotatable shaft 23 extending transversely through the exhaust pipe 14 and the joint pipe 19, a pair of valve disks 24, 25 mounted on the shaft 23 respectively in the exhaust pipe 14 and the joint pipe 19, and a motor 26 for rotating the shaft 23 about its own axis to turn the valve disks 24, 25 in unison with the shaft 23.

The valve disks 24, 25 selectively open and close the exhaust pipe 14 and the joint pipe 19 when rotated in one direction or the other together with the shaft 23 by the motor 26. The valve disks 24, 25 are angularly displaced about 90° from each other about the axis of the shaft 23. When the valve disk 24 is rotated into an angular position to close the exhaust pipe 14, the valve disk 25 is simultaneously rotated to an angular position to open the joint pipe 19, as shown in FIG. 1. In the angular positions shown in FIG. 1, the exhaust pipe 14 is closed and the joint pipe 19 is opened to vent only the second exhaust pipe 17 to the atmosphere through the downstream exhaust pipe 10c.

When the valve disk 24 is rotated into an angular position to open the exhaust pipe 14, the valve disk 25 is simultaneously rotated to an angular position to close the joint pipe 19. The valve disks 24, 25 are now rotated with the shaft 23 about 90° from their angular positions shown in FIG. 1. In these angular positions, the exhaust pipe 14 is opened and the joint pipe 19 is closed to vent only the first exhaust pipe 15 to the atmosphere through the downstream exhaust pipe 10c.

While the shaft 23 is rotated by the motor 26 in the illustrated embodiment shown in FIG. 1, the shaft 23 may alternatively be rotated by a pneumatic actuator based on the negative pressure in the intake pipe 7 for operating the valve disks 24, 25 in the manner described above.

The exhaust gas purifying system according to the illustrated embodiment also has, in addition to the mechanical components described above, a control arrangement, described below, for controlling operation of the internal combustion engine 1 and the exhaust gas adsorption unit 13.

The exhaust gas purifying system includes an engine controller 27 for controlling operation of the internal combustion engine 1 including the solenoid-operated on/off valve 21 that is mounted in the EGR passage 20. The engine controller 27 comprises a microcomputer, and is supplied with detected signals from various sensors, indicative of a rotational speed NE of the internal combustion engine 1, an engine temperature (coolant temperature) TW of the internal combustion engine 1, an inner pressure (intake pressure) PB in the intake pipe 7 downstream of the throttle valve 5, and an accelerator pedal displacement AP of an accelerator pedal (not shown) for operating the throttle valve 5, and also supplied with operation start and stop command signals for the internal combustion engine 1 from an operation switch (not shown).

The engine controller 27 controls operation of the internal combustion engine 1 based on the supplied detected signals and operation start and stop command signals according to a predetermined control program. Specifically, the engine controller 27 controls the opening of the throttle valve 5 with an actuator to control the amount of intake air to be introduced into the internal combustion engine 1, controls the amount of fuel to be injected by the fuel injector 6 to control the amount of fuel to be supplied to the internal combustion engine 1, controls the ignition device to control ignition timing, control the startup of the internal combustion engine 1 with a starter motor, and controls operation of the on/off valve 21 in the EGR passage 20 and also the opening thereof.

The exhaust gas purifying system also has an air-fuel ratio sensor 28 as a first exhaust gas sensor mounted on the housing 16 and facing the second exhaust passage 17 upstream of the HC adsorbent 12 therein, i.e., outwardly of the holes 18 in the exhaust pipe 14, an air-fuel ratio sensor 29 as a second exhaust gas sensor mounted on the housing 16 and facing the second exhaust passage 17 downstream of the HC adsorbent 12 therein and upstream of the joint pipe 19 and the EGR passage 20, a temperature sensor 30 mounted on the housing 16 and facing the HC adsorbent 12 for detecting the temperature of the HC adsorbent 12, and a purifying system controller 32 for evaluating a deteriorated state of the HC adsorbent 12, controlling operation of an alarm unit 31 which issues an alarm depending on the evaluated deteriorated state of the HC adsorbent 12, and controlling operation of the switching valve mechanism 22.

The alarm unit 31 comprises a buzzer, a lamp, or a display unit capable of displaying characters, graphic patterns, etc. The temperature sensor 30 comprises a thermistor or the like.

The temperature sensor 30 may be positioned in any location upstream or downstream of the HC adsorbent 12 insofar as the temperature at the location is approximately equal to the temperature of the HC adsorbent 12. For example, if a temperature sensor is provided for detecting the temperature in the second exhaust passage 17 upstream or downstream of the HC adsorbent 12, then such a temperature sensor may be used as a temperature sensor for detecting the temperature of the HC adsorbent 12. If a temperature sensor for detecting the temperature of the catalytic converter 11 is provided in the catalytic converter 11 or if a temperature sensor for detecting the temperature of the exhaust gas having passed through the catalytic converter 11, i.e., the exhaust gas to be introduced into the exhaust gas adsorption unit 13, is provided in the intermediate exhaust pipe 10b, then the temperature detected by such a temperature sensor may be used as the temperature of the HC adsorbent 12.

The air-fuel ratio sensors 28, 29 have the same characteristics. As shown in FIG. 2(a), the air-fuel ratio sensors 28, 29 produce an output (voltage signal) which linearly changes depending on the HC concentration in the exhaust gas at the locations of the air-fuel ratio sensors 28, 29. The air-fuel ratio sensors 28, 29 are also sensitive to various gas components other than HC in the exhaust gas. For example, the output of the air-fuel ratio sensors 28, 29 also changes depending on the $O_2$ concentration, CO concentration, and $H_2$ concentration in the exhaust gas, as shown in FIGS. 2(b) through 2(d), respectively.

Since an air-fuel ratio sensor of the type described above has its output linearly variable depending on the $O_2$ concentration in the exhaust gas that represents the air-fuel ratio of the air-fuel mixture combusted in the internal combustion engine, it is generally used as a sensor for detecting the air-fuel ratio.

The purifying system controller 32 comprises a microcomputer, and is supplied with various operating state data including the rotational speed NE of the internal combustion engine 1, the intake pressure PB, etc. from engine controller 27, and also with outputs from the air-fuel ratio sensors 28, 29 and the temperature sensor 30. Based on the supplied data and signals, the purifying system controller 32 performs its control processes including a process of evaluating a deteriorated state of the HC adsorbent 12 in a predetermined control cycle of a constant period according to a predetermined program.

The process of evaluating a deteriorated state of the HC adsorbent 12 with the purifying system controller 32 will be described below.

According to the present embodiment, in order to evaluate a deteriorated state of the HC adsorbent 12, it is a basic requirement for the purifying system controller 32 to recognize the amount of HC adsorbed by the HC adsorbent 12 in the adsorption mode per predetermined unit time or the amount of HC desorbed from the HC adsorbent 12 in the desorption mode per predetermined unit time while the exhaust gas from the internal combustion engine 1 is being supplied to the second exhaust passage 17.

The amount of HC adsorbed by or desorbed from the HC adsorbent 12 is basically correlated to the difference between the outputs from the air-fuel ratio sensors 28, 29. Therefore, the amount of HC adsorbed by or desorbed from the HC adsorbent can be recognized based on the difference between the outputs from the air-fuel ratio sensors 28, 29.

However, the correlation between the difference between the outputs from the air-fuel ratio sensors 28, 29 and the actual amount of HC adsorbed by or desorbed from the HC adsorbent may be lowered due to the effect of disturbance caused by the components including $O_2$, CO, $H_2$, etc. other than HC in the exhaust gas to which the air-fuel ratio sensors 28, 29 are sensitive, and the delay characteristics of the HC adsorbent 12 positioned between the air-fuel ratio sensors 28, 29.

According to the present embodiment, in order to compensate for the effect of disturbance to recognize highly accurately the actual amount of HC adsorbed by or desorbed from the HC adsorbent, a model is constructed in advance for expressing the output of the downstream air-fuel ratio 29 with the output of the upstream air-fuel ratio 28.

Stated otherwise, the model expresses the behavior of a system (hereinafter referred to as "modeled system") that ranges from the upstream air-fuel ratio sensor 28 to the downstream air-fuel ratio sensor 29 in the second exhaust passage 17, with a discrete time system, and is represented by the following equation (2):

$$VS2(k)=a1 \cdot VS1(k)+a2 \cdot VS1(k-1)+a3 \cdot VS1(k-2)+a4 \cdot VS1(k-3)+b1 \quad (2)$$

The equation (2) is equivalent to the equation (1) where m=4. In the equation (2), VS1 represents the output of the upstream air-fuel ratio sensor 28 as an input quantity applied to the modeled system, VS2 represents the output of the downstream air-fuel ratio sensor 29 as an output quantity produced by the modeled system, k represents the ordinal number of a control cycle executed by the purifying system controller 32, a1, a2, a3, a4 represent coefficient parameters relative to respective time-series data VS1(k), VSs(k−1), VSv(k−2), VS1(k−3) of the output VS1 of the upstream air-fuel ratio sensor 28 on the right side of the equation (2), and b1 represents a monomial parameter having a value independent of the output VS1 of the upstream air-fuel ratio sensor 28. The coefficient parameters a1, a2, a3, a4 and the monomial parameter b1 are parameters to be identified as certain values in prescribing the behavior or the model. In the present embodiment, these parameters a1–a4, b1 are successively identified based on the actual outputs VS1, VS2 of the air-fuel ratio sensors 28, 29 while the exhaust gas from the internal combustion engine 1 is being supplied to the second exhaust passage 17.

A verbal description of the discrete time model expressed by the equation (2) is given as follows: The output VS2(k) of the downstream air-fuel ratio sensor 29 in each control cycle of the purifying system controller 32 is expressed by the plural time-series data VS1(k), VS1(k−1), VS1(k−2), VS1(k−3) of the output VS1 of the upstream air-fuel ratio sensor 28, the coefficient parameters a1–a4 relative to those time-series data, and the monomial parameter b1.

If the monomial parameter b1 is set to a suitable constant C (e.g., C=1), then since b1=(b1/C)·C, (b1/C) can be regarded as a coefficient parameter relative to the constant C. Therefore, the discrete time model expressed by the equation (2) can mathematically be described such that the output VS2(k) of the downstream air-fuel ratio sensor 29 is expressed by a linear combination of the plural time-series data VS1(k), VS1(k−1), VS1(k−2), VS1(k−3) of the output VS1 of the upstream air-fuel ratio sensor 28 and an arbitrary constant (e.g., "1").

According to the present embodiment, while the coefficient parameters a1–a4 and the monomial parameter b1 (these parameters a1–a4, b1 will hereinafter be referred to as "model parameters") of the model thus constructed are being successively identified, the output VS2 of the downstream air-fuel ratio sensor 29 is successively estimated using the model. Then, the difference (=VS1−VS2/HAT, which will hereinafter be referred to as "HC concentration estimated difference DHCHAT") between the actual output VS1 of the upstream air-fuel ratio sensor 28 and an estimated value of the output VS2 of the downstream air-fuel ratio sensor 29 (the estimated value will hereafter be referred to as "estimated output VS2/HAT") is used instead of the difference (=VS1−VS2) between the outputs of the air-fuel ratio sensors 28, 29 to recognize the amount of HC adsorbed by and the amount of HC desorbed from the HC adsorbent 12 per unit time.

Figure 3:
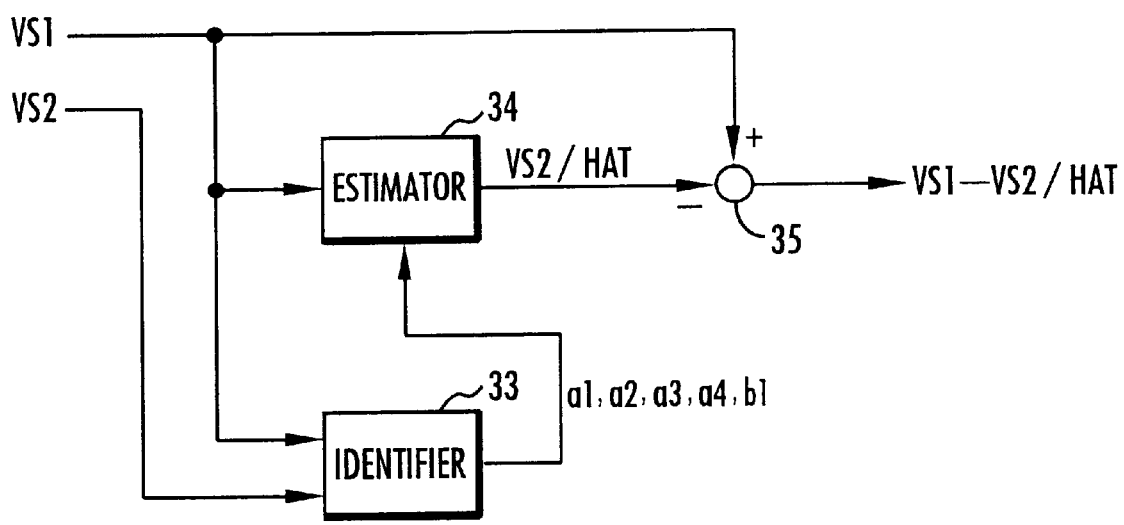
FIG. 3 is a block diagram of a portion of the system shown in FIG. 1.

In order to identify the model parameters a1–a4, b1, calculate the estimated output VS2/HAT of the downstream air-fuel ratio sensor 29, and calculate the HC concentration estimated difference DHCHAT, the purifying system controller 32 has a functional arrangement as shown in FIG. 3.

In FIG. 3, the purifying system controller 32 has an identifier 33 for successively identifying the values of the model parameters a1–a4, b1 based on the actual outputs VS1, VS2 of the air-fuel ratio sensors 28, 29 in each control cycle, an estimator 34 for determining the estimated output VS2/HAT of the downstream air-fuel ratio sensor 29 using the identified values of the model parameters a1–a4, b1 and the time-series data of the actual output VS1 of the upstream air-fuel ratio sensor 28, and a subtractor 35 for subtracting the estimated output VS2/HAT from the actual output VS1 of the upstream air-fuel ratio sensor 28 to determine the HC concentration estimated difference DHCHAT (=VS1−VS2/HAT).

The identifier 33 executes an algorithm, described below, in each control cycle of the purifying system controller 32 to successively update and determine the model parameters a1–a4, b1.

In each control cycle of the purifying system controller 32, the identifier 33 calculates the right side of the equation (2) using the presently set values of the model parameters a1–a4, b1, i.e., identified values a1(k−1), a2(k−1), a3(k−1), a4(k−1), b1(k−1) of the model parameters a1–a4, b1 which have finally been obtained in the preceding control cycle, as values of the model parameters a1–a4, b1 on the right side of the equation (2). In this manner, the identifier 33 determines an output VS2/M (hereinafter referred to as "model output VS2/M") of the downstream air-fuel ratio sensor 29 on the model according to the following equation (3):

$$VS2/M(k) = a1(k-1) \cdot VS1(k) + a2(k-1) \cdot VS1(k-1) + \quad (3)$$
$$a3(k-1) \cdot VS1(k-2) + a4(k-1) \cdot VS1(k-3) +$$
$$b1(k-1)$$
$$= \Theta^T(k-1) \cdot \zeta(k)$$

where
$\Theta^T(k) = [a1(k)\ a2(k)\ a3(k)\ a4(k)\ b1(k)]$
$\zeta^T(k) = [VS1(k)\ VS1(k-1)\ VS1(k-2)\ VS1(k-4)\ 1]$ In the equation (3), the symbols $\Theta$, $\zeta$ represent vectors (column vectors) defined in the defining phrase of the equation (3). The symbol T in the equation (3) and its defining phrase represents transposition.

The identifier 33 determines an error between the present value VS2(k) of the actual output of the downstream air-fuel ratio sensor 29 and the model output VS2/M(k), i.e., an error ID/E(k) (hereinafter referred to as "identified error ID/E(k)") according to the following equation (4):

$$ID/E(k) = VS2/M(k) - VS2(k) \quad (4)$$

The identifier 33 successively updates and determines identified values of the model parameters a1–a4, b1 according to an algorithm for minimizing the identified error ID/E(k) (more precisely, the absolute value of the identified error ID/E(k)). The updating process, i.e., the process of determining new identified values a1(k), a2(k), a3(k), a4(k), b1(k), is carried out according to the equation (5) given below. Specifically, the identified values of the model parameters a1–a4, b1 are changed from the present values a1(k−1), a2(k−1), a3(k−1), a4(k−1), b1(k−1), respectively, by quantities proportional to the value of the identified error ID/E(k) thereby to determine new identified values a1(k), a2(k), a3(k), a4(k), b1(k).

$$\Theta(k) = \Theta(k-1) - Kp(k) \cdot ID/E(k) \quad (5)$$

where Kp(k) represents a vector determined according to the equation (6), given below, in each control cycle, and determines the rate of change (gain) depending on the identified error ID/E(k). In the equation (6), P(k) represents a matrix that is updated according to the recurrence formula (7) in each control cycle.

$$Kp(k) = \frac{P(k-1) \cdot \zeta(k)}{1 + \zeta^T(k) \cdot P(k-1) \cdot \zeta(k)} \quad (6)$$

$$P(k) = \frac{1}{\lambda_1} \cdot \left( I - \frac{\lambda_2 \cdot P(k-1) \cdot \zeta(k) \cdot \zeta^T(k)}{\lambda_1 + \lambda_2 \cdot \zeta^T(k) \cdot P(k-1) \cdot \zeta(k)} \right) \cdot P(k-1) \quad (7)$$

where I represents a unit matrix.

An initial value of the matrix P(k) in the equation (7) is a diagonal matrix whose diagonal components are a positive number each. In the equation (7), $\lambda_1, \lambda_2$ are set to values that satisfy the conditions: $0 < \lambda_1 \leq 1$ and $0 < \lambda_2 \leq 1$.

Depending on how the values of $\lambda_1, \lambda_2$ are set, various specific algorithms including a method of least squares, a method of weighted least squares, a fixed gain method, a degression method, etc. are constructed. According to the present embodiment, a method of least squares ($\lambda_1 = \lambda_2 = 1$) is employed.

The above algorithm is used for the identifier 33 to successively determine identified values of the model parameters a1–a4, b1 in each control cycle of the purifying system controller 32.

Using the determined identified values of the model parameters a1–a4, b1, the estimator 34 determines an estimated output VS2/HAT(k) of the downstream air-fuel ratio sensor 29 in each control cycle of the purifying system controller 32 according to the following equation (8):

$$VS2/HAT(k) = a1(k-1) \cdot VS1(k) + a2(k-1) \cdot VS1(k-1) + \quad (8)$$
$$a3(k-1) \cdot VS1(k-2) + a4(k-1) \cdot VS1(k-3) +$$
$$b1(k-1)$$
$$= VS2/M(k)$$

Specifically, the estimator 34 calculates the right side of the equation (2) using the identified values a1(k−1), a2(k−1), a3(k−1), a4(k−1), b1(k−1) which the identifier 33 has determined in the preceding control cycle, as values of the model parameters a1–a4, b1 in each control cycle. Stated otherwise, the estimator 34 obtains the value of the model output VS2/M/k) that the identifier 33 calculates according to the equation (3) in the process of determining the identified values of the model parameters a1–a4, b1 in each control cycle, as an estimated output VS2/HAT(k) of the downstream air-fuel ratio sensor 29. This is a process for the estimator 34 to determine an estimated output VS2/HAT(k).

When the estimated output VS2/HAT(k) of the downstream air-fuel ratio sensor 29 is thus determined, the difference between the estimated output VS2/HAT(k) and the actual output VS1(k) of the upstream air-fuel ratio sensor 28, i.e., the HC concentration estimated difference DHCHAT(k) (=VS1(k)−VS2/HAT(k)) determined by the subtractor 35, is basically considered to be the difference (=VS1(k)−VS2(k)) between the actual outputs VS1(k), VS2(k) of the air-fuel ratio sensors 28, 29, from which a disturbance component not related to the amount of HC adsorbed by or desorbed from the HC adsorbent 12 has been eliminated.

The reason for the above conclusion is as follows: When the equation (8) is applied to the equation (4) to express the HC concentration estimated difference DHCHAT(k) using the identified error ID/E(k), the following equation (9) is obtained:

$$DHCHAT(k) = VS1(k) - VS2/HAT(k) \quad (9)$$
$$= VS1(k) - VS2/M(k)$$
$$= (VS1(k) - VS2(k)) - ID/E(k)$$

According to the characteristics of the algorithm of the identifier 33 for determining identified values of the model parameters a1–a4, b1 for minimizing the identified error ID/E(k), ID/E(k) basically corresponds to the above disturbance component.

As can be seen from the equation (9), the HC concentration estimated difference DHCHAT(k) (=VS1(k)−VS2/HAT (k)) is equal to the difference (=VS1(k)−VS2(k)) between the actual outputs VS1(k), VS2(k) of the air-fuel ratio sensors 28, 29, from which the disturbance component has been eliminated. Therefore, the HC concentration estimated difference DHCHAT(k) is highly correlated to the amount of HC adsorbed by or desorbed from the HC adsorbent 12.

Operation of the exhaust gas purifying system according to the present embodiment, particularly for evaluating a deteriorated state of the HC adsorbent 12, will be described below.

When a start switch is turned on in order to start operating the internal combustion engine 1, the engine controller 27 and the purifying system controller 32 are activated. The engine controller 27 performs a startup control process to start operating the internal combustion engine 1. Specifically, the engine controller 27 controls the starter motor to rotate the crankshaft of the internal combustion engine 1. The engine controller 27 also controls the fuel injector 6 to supply fuel to the internal combustion engine 1 and also controls the ignition device to start operating the internal combustion engine 1.

Figure 4:
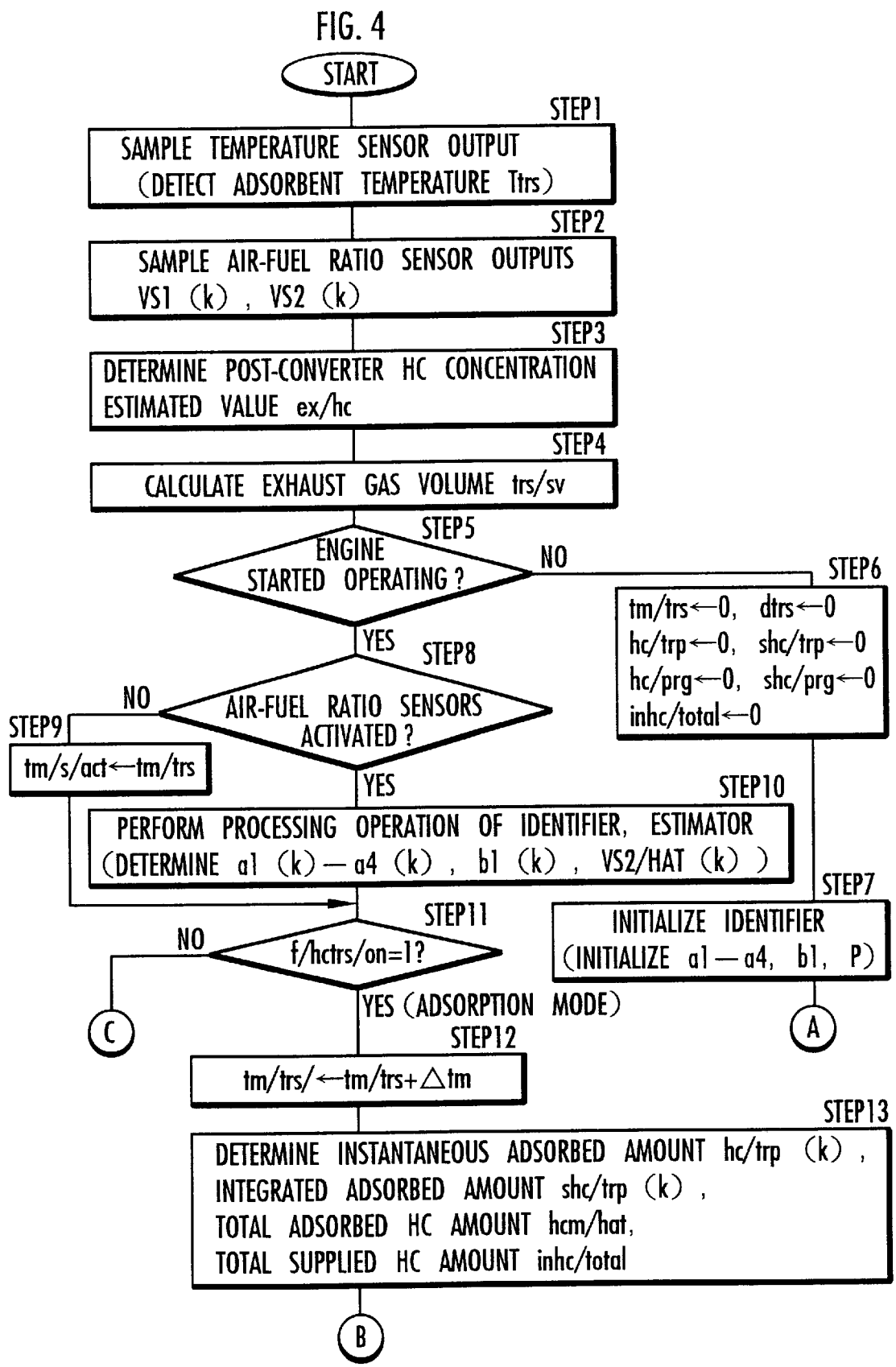
FIGS. 4 and 5 are a flowchart of a main routine of an operation sequence of the system shown in FIG. 1.
Figure 5:
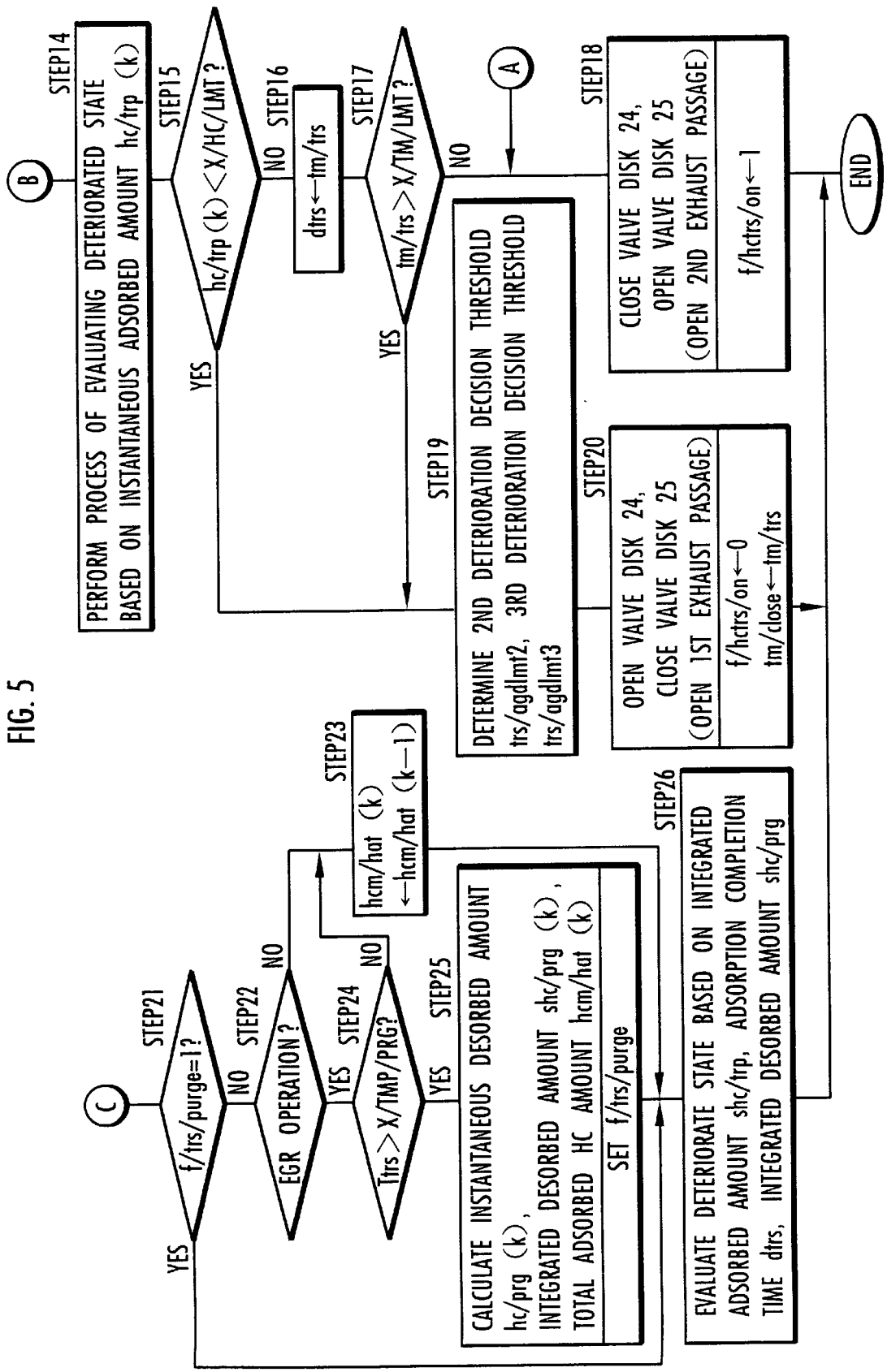

At the same time, the purifying system controller 32 executes a main routine shown in FIGS. 4 and 5 in each control cycle thereof.

Prior to the detailed description of the operation sequence of the purifying system controller 32, the overall operation sequence of the purifying system controller 32 will be summarized as follows:

When the internal combustion engine 1 starts to operate, the purifying system controller 32 controls the motor 26 of the switching valve mechanism 22 to rotate the valve disks 24, 25 to closed and open positions, respectively. Therefore, the first exhaust passage 15 is shut off from the atmosphere, and the second exhaust passage 17 is vented to the atmosphere.

Therefore, when the internal combustion engine 1 operates, the exhaust gas emitted from the internal combustion engine 1 is discharged into the atmosphere successively via the upstream exhaust pipe 10a, the catalytic converter 11, the intermediate exhaust pipe 10b, the second exhaust passage 17, the joint pipe 19, and the downstream exhaust pipe 10c. While the exhaust gas is passing through the second exhaust passage 17, HC in the exhaust gas is adsorbed by the HC adsorbent 12. A mode of operation in which the exhaust gas emitted from the internal combustion engine 1 is supplied to the second exhaust passage 17 and HC in the exhaust gas is adsorbed by the HC adsorbent 12 is referred to as "adsorption mode".

The adsorption mode is carried out until the HC adsorbent 12 is saturated and can no longer adsorb HC or a predetermined period of time elapses after the internal combustion engine 1 has started to operate. In the adsorption mode, various parameters relative to the first through third evaluating processes, described above, including the amount of HC adsorbed by the HC adsorbent 12 per unit time, i.e., per control cycle of the purifying system controller 32 in the present embodiment, are determined. Furthermore, a deteriorated state of the HC adsorbent 12 based on the first evaluating process is successively evaluated.

When the adsorption mode is over, the purifying system controller 32 controls the motor 26 of the switching valve mechanism 22 to rotate the valve disks 24, 25 to open and closed positions, respectively. Therefore, the first exhaust passage 15 is vented to the atmosphere, and the second exhaust passage 17 is shut off from the atmosphere.

The exhaust gas emitted from the internal combustion engine 1 is discharged into the atmosphere successively via the upstream exhaust pipe 10a, the catalytic converter 11, the intermediate exhaust pipe 10b, the first exhaust passage 15, and the downstream exhaust pipe 10c.

Then, the purifying system controller 32 evaluates a deteriorated state of the HC adsorbent 12 based on the second and third evaluating processes.

While the first exhaust passage 15 is being open, the engine controller 27 opens the solenoid-operated on/off valve 21 in the EGR passage 20 at a time depending on the rotational speed NE and the intake pressure PB of the internal combustion engine 1.

A portion of the exhaust gas flowing into the first exhaust passage 15 flows via the holes 18 in the exhaust pipe 14 into the second exhaust passage 17 and then from the second exhaust passage 17 via the EGR passage 20 back into the intake pipe 7. If the temperature of the HC adsorbent 12 has risen to a temperature for the desorption mode (usually, soon after the adsorption mode, the temperature of the HC adsorbent 12 increases to such a temperature due to the heat of the exhaust gas flowing through the first exhaust passage 15), then the HC adsorbed by the HC adsorbent 12 in the adsorption mode is desorbed from the HC adsorbent 12. The desorbed HC is supplied via the EGR passage 20 and the intake pipe 7 to the combustion chamber 4 of the internal combustion engine 1 and combusted in the combustion chamber 4.

When the HC is desorbed from the HC adsorbent 12, the purifying system controller 32 determines various parameters relative to the fourth evaluating process, including the amount of HC desorbed from the HC adsorbent 12 per unit time (per control cycle), and evaluates a deteriorated state of the HC adsorbent 12 based on the fourth evaluating process.

On the basis of the above summary of the overall operation sequence of the purifying system controller 32, details of the operation sequence of the purifying system controller 32 will be described below.

When the purifying system controller 32 is activated upon startup of the internal combustion engine 1 as described above, the purifying system controller 32 executes the main routine shown in FIGS. 4 and 5 in predetermined control cycles.

The purifying system controller 32 samples the output of the temperature sensor 30 to detect a temperature Ttrs of the HC adsorbent 12 (hereinafter referred to as "adsorbent temperature Ttrs") in STEP1. The purifying system controller 32 then samples outputs VS1, VS2 of the air-fuel ratio sensors 28, 29 in STEP2.

The purifying system controller 32 determines an estimated value ex/hc (hereinafter referred to as "post-converter HC concentration estimated value ex/hc") of the concentration of HC contained in the exhaust gas that has passed through the catalytic converter 11, i.e., the exhaust gas to flow into the exhaust gas adsorption unit 13, in STEP3.

Figure 6:
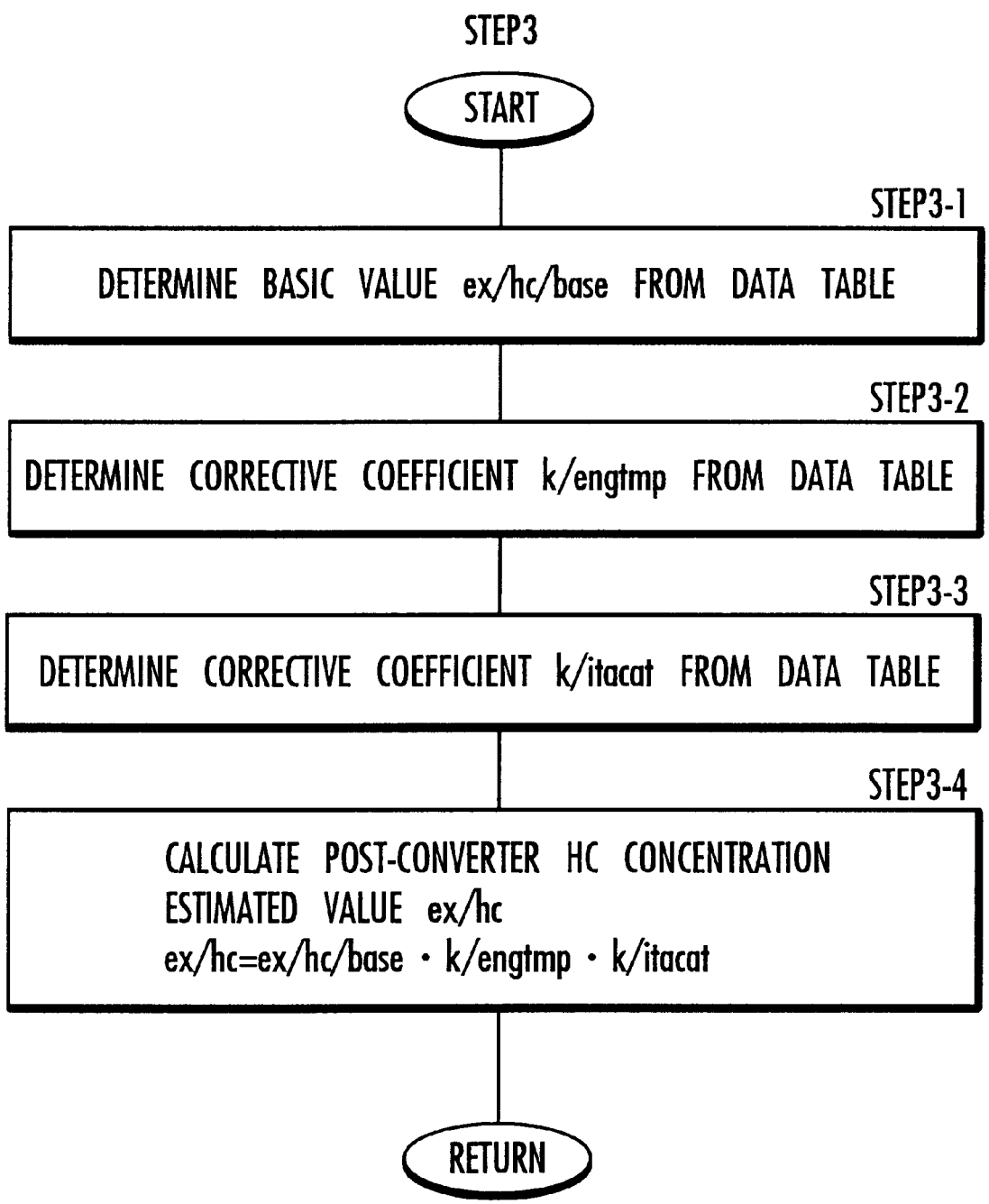
FIG. 6 is a flowchart of a subroutine of the operation sequence shown in FIG. 4.

The purifying system controller 32 determines the post-converter HC concentration estimated value ex/hc according to a subroutine shown in FIG. 6.

Figure 7:
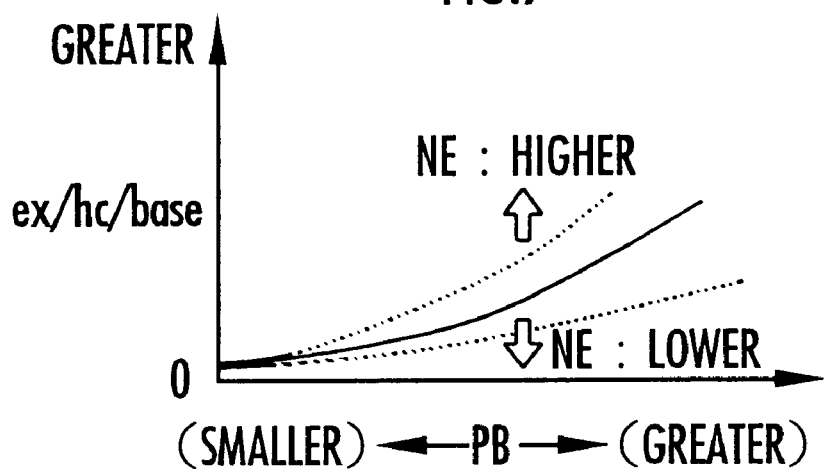
FIG. 7 is a diagram showing a data table used in the subroutine shown in FIG. 6.

Specifically, the purifying system controller 32 determines a basic value ex/hc/base of the HC concentration in the exhaust gas emitted from the internal combustion engine 1 from the present intake pressure PB and the present rotational speed NE given from the engine controller 27, based on a predetermined data table shown in FIG. 7, in STEP3-1.

Generally, the HC concentration in the exhaust gas is greater as the intake pressure PB is higher, i.e., as the amount of intake air supplied to the internal combustion engine 1 is greater, and is also greater as the rotational speed NE is higher. In the data table shown in FIG. 7, therefore, the basic value ex/hc/base is determined according to such a tendency with respect to the intake pressure PB and the rotational speed NE.

Figure 8:
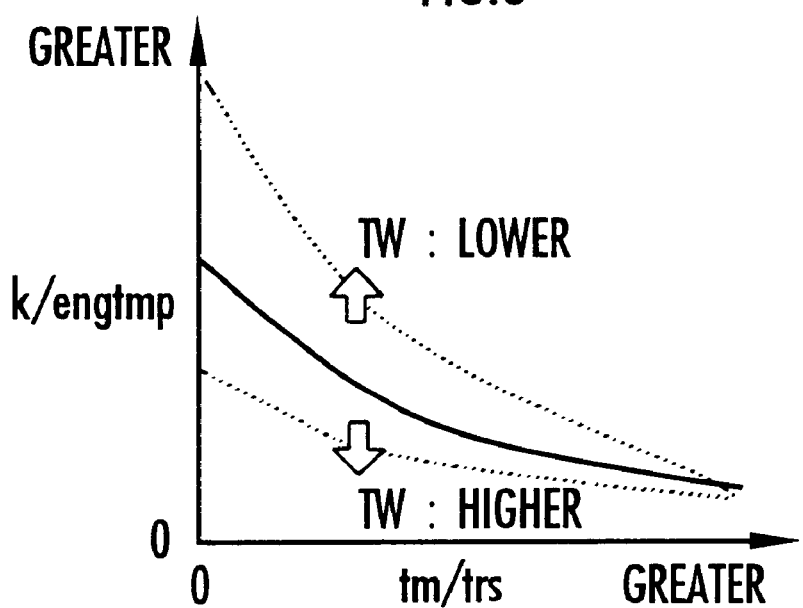
FIG. 8 is a diagram showing a data table used in the subroutine shown in FIG. 6.

Then, the purifying system controller 32 determines a corrective coefficient k/engtmp for correcting the basic value ex/hc/base depending on the warmed state of the internal combustion engine 1, from the present value of an elapsed time tm/trs after the internal combustion engine 1 has started to operate (hereinafter referred to as "after-engine-start elapsed time tm/trs") and the present value of the engine temperature TW, based on a predetermined data table shown in FIG. 8, in STEP3-2.

Generally, the HC concentration in the exhaust gas emitted from the internal combustion engine 1 is smaller as the warming-up of the internal combustion engine 1 progresses. The corrective coefficient k/engtmp corrects the basic value ex/hc/base by multiplying the same. In the data table shown in FIG. 8, the corrective coefficient k/engtmp is determined such that it is smaller as the after-engine-start elapsed time tm/trs is longer and the engine temperature TW is higher.

The engine temperature TW required to determine the corrective coefficient k/engtmp is supplied from the engine controller 27 to the purifying system controller 32. The after-engine-start elapsed time tm/trs is measured in STEP12, described later on.

Figure 9:
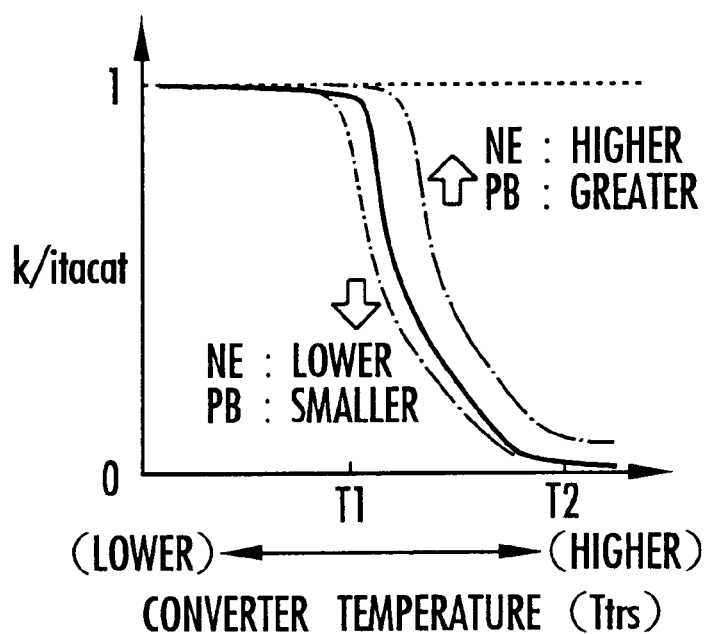
FIG. 9 is a diagram showing a data table used in the subroutine shown in FIG. 6.

The purifying system controller 32 determines a corrective coefficient k/itacat for correcting the basic value ex/hc/base depending on the ability of the catalytic converter 11 to purify HC by multiplying the basic value ex/hc/base, from the present temperature of the catalytic converter 11 and the present intake pressure PB and the present rotational speed NE, based on a predetermined data table shown in FIG. 9, in STEP3-3. In the present embodiment, the adsorbent temperature Ttrs detected in STEP1 is substituted for the temperature of the catalytic converter 11.

Basically, when the temperature of the catalytic converter 11 is in a low temperature range up to a temperature T1 shown in FIG. 9, the catalytic converter 11 is not activated and purifies almost no HC in the exhaust gas. As the temperature of the catalytic converter 11 becomes higher than the temperature T1, the catalytic converter 11 is abruptly activated to purify HC in the exhaust gas. When the temperature of the catalytic converter 11 reaches a high temperature range equal to or higher than a temperature T2 that is slightly higher than the temperature T1, the catalytic converter 11 purifies most of HC in the exhaust gas. When the temperature of the catalytic converter 11 falls between the temperatures T1, T2, the amount of HC that is not purified by the catalytic converter 11 and hence remains in the exhaust gas becomes greater as the rotational speed NE and the intake pressure PB are higher and the amount of the exhaust gas supplied from the internal combustion engine 1 to the catalytic converter 11, which is substantially proportional to the product of the rotational speed NE and the intake pressure PB, is greater.

In the data table shown in FIG. 9, the corrective coefficient k/itacat is set to k/itacat=1 when the temperature of the catalytic converter 11 is in the low temperature range up to the temperature T1. When the temperature of the catalytic converter 11 is equal to or higher than the temperature T1, the corrective coefficient k/itacat is sharply reduced toward "0". When the temperature of the catalytic converter 11 is equal to or higher than the temperature T2, the corrective coefficient k/itacat is substantially "0". When the temperature of the catalytic converter 11 falls between the temperatures T1, T2, the corrective coefficient k/itacat is higher as the rotational speed NE and the intake pressure PB are higher and the amount of the exhaust gas emitted from the internal combustion engine 1 is greater.

Then, the purifying system controller 32 multiplies the basic value ex/hc/base determined in STEP3-1 by the corrective coefficients k/engtmp, k/itacat determined in STEP3-2, STEP3-3, for thereby determining the postconverter HC concentration estimated value ex/hc in the present control cycle in STEP3-4. Control then returns to the main routine shown in FIG. 4.

By thus determining the post-converter HC concentration estimated value ex/hc, the purifying system controller 32 can determine the HC concentration in the exhaust gas that flows into the exhaust gas adsorption unit 13 relatively accurately.

Referring back to FIG. 4, the purifying system controller 32 determines the amount trs/sv of the exhaust gas supplied from the internal combustion engine 1 to the exhaust gas adsorption unit 13, i.e., the amount trs/sv of the exhaust gas emitted from the internal combustion engine 1 per unit time (hereinafter referred to as "exhaust gas volume trs/sv") in STEP4.

The exhaust gas volume trs/sv is approximately proportional to the product of the rotational speed NE and the intake pressure PB. In the present embodiment, the purifying system controller 32 determines the exhaust gas volume trs/sv using the rotational speed NE and the intake pressure PB according to the following equation (10):

$$trs/sv = \frac{NE}{1500} \cdot PB \cdot X/SVPRA \qquad (10)$$

where X/SVPRA represents a constant determined depending on the displacement of the internal combustion engine 1. In the present embodiment, the exhaust gas volume when the rotational speed NE is 1500 rpm is used as a reference. In the equation (10), therefore, the present rotational speed NE is divided by "1500".

The exhaust gas volume trs/sv may be directly determined using a flow sensor or the like, rather than by the above process.

Then, the purifying system controller 32 decides whether the internal combustion engine 1 has started to operate, based on the operation status information of the internal combustion engine 1 that is supplied from the engine controller 27 in STEP5.

In the present embodiment, the internal combustion engine 1 starts to operate when fuel starts to be supplied to the internal combustion engine 1, i.e., when fuel starts being injected by the fuel injector 6. The internal combustion engine 1 does not start to operate after the exhaust gas purifying system is activated until fuel starts to be supplied to the internal combustion engine 1.

If the internal combustion engine 1 has not started to operate in STEP5, then the purifying system controller 32 initializes the value of the after-engine-start elapsed time tm/trs and the values of various parameters dtrs, hc/trp, shc/trp, hc/prg, shc/prg, inhc/total, described later on, relative to the evaluation of a deteriorated state of the HC adsorbent 12 to "0" in STEP6. The purifying system controller 32 sets the model parameters a1 a4, b1 to predetermined initial values, thus initializing the identifier 33 in STEP7. Thereafter, the purifying system controller 32 performs the processing in STEP18 (see FIG. 5), after which the processing in the present control cycle is finished.

In STEP18, the purifying system controller 32 controls the motor 26 of the switching valve mechanism 22 to rotate the valve disks 24, 25 to closed and open positions, respectively, so that the first exhaust passage 15 is shut off from the atmosphere, and the second exhaust passage 17 is vented to the atmosphere.

If the internal combustion engine 1 starts operating when the switching valve mechanism 22 is thus operated, then the exhaust gas emitted from the internal combustion engine 1 is discharged into the atmosphere via the second exhaust passage 17 with the HC adsorbent 12 disposed therein. Consequently, the exhaust gas purifying system is in the adsorption mode after the internal combustion engine 1 has started operating.

In STEP18, the purifying system controller 32 sets a flag f/hctrs/on (hereinafter referred to as "adsorption enable/disable flag f/hctrs/on") to "1". The adsorption enable/disable flag f/hctrs/on is "1" when it indicates that the exhaust gas purifying system is in the adsorption mode, and "0" when it indicates that the exhaust gas purifying system is not in the adsorption mode.

The engine controller 27 starts to operate the internal combustion engine 1. If the purifying system controller 32 recognizes the internal combustion engine 1 has started to operate in STEP5, then the purifying system controller 32 decides whether the air-fuel ratio sensors 28, C29 are activated or not based on the present outputs VS1, VS2 of the air-fuel ratio sensors 28, 29 that have been sampled in STEP2, in STEP8.

If the air-fuel ratio sensors 28, 29 are not activated, then the purifying system controller 32 sets the value of a parameter tm/s/act (hereinafter referred to as "sensor activation time parameter tm/s/act") for recognizing the time in which the air-fuel ratio sensors 28, 29 are activated, i.e., the period of time after the internal combustion engine 1 has started to operate until the air-fuel ratio sensors 28, 29 are activated, to the present value of the after-engine-start elapsed time tm/trs in STEP9. Control then goes to STEP11.

After the time when the air-fuel ratio sensors 28, 29 are judged as being activated in STEP8, the value of the sensor activation time parameter tm/s/act is held to the value of after-engine-start elapsed time tm/trs in a preceding control cycle at the time.

If the air-fuel ratio sensors 28, 29 are judged as being activated in STEP8, then the purifying system controller 32 performs the processing operation of the identifier 33 and the estimator 34 in STEP11. Thereafter, control proceeds to STEP11.

In STEP10, the purifying system controller 32 successively calculates the equations (3), (4), (6), (5) to calculate new identified values a1(k)–a4(k), b1(k) of the model parameters a1–a4, b1, i.e., updates the identified values. The purifying system controller 32 also calculates the equation (7) to update the matrix P used in the equation (6). The purifying system controller 32 obtains the model output VS2M(k) determined according to the equation (3) as an estimated output VS2/HAT(k) of the downstream air-fuel ratio sensor 29 in the present control cycle (see the equation (8)) in the process of calculating the identified values of the model parameters a1–a4, b1.

In STEP11, the purifying system controller 32 determines the present value of the adsorption enable/disable flag f/hctrs/on.

Immediately after the internal combustion engine 1 has started to operate, the exhaust gas purifying system is in the adsorption mode, and hence the adsorption enable/disable flag f/hctrs/on is set to f/hctrs/on=1. In the adsorption mode, basically, HC in the exhaust gas passing through the second exhaust passage 17 is adsorbed by the HC adsorbent 12.

When the exhaust gas purifying system is in the adsorption mode (f/hctrs/on=1), the purifying system controller 32 increments the value of the after-engine-start elapsed time tm/trs by a predetermined value Atm (specifically, the time of one control cycle) in STEP12. In the adsorption mode, the processing in STEP12 is repeated in each control cycle after the internal combustion engine 1 has started to operate, for thereby measuring the after-engine-start elapsed time tm/trs.

Then, the purifying system controller 32 determines an amount of HC adsorbed by the HC adsorbent 12 in the present control cycle, i.e., an amount hc/trp of HC adsorbed by the HC adsorbent 12 per control cycle (per unit time) (hereinafter referred to as "instantaneous adsorbed amount hc/trp"), an integrated adsorbed amount shc/trp representing the integrated instantaneous adsorbed amount hc/trp, a total amount hcm/hat of HC adsorbed by the HC adsorbent 12 (hereinafter referred to as "total adsorbed HC amount hcm/hat"), and a total amount inhc/total of HC supplied to the second exhaust passage 17 (hereinafter referred to as "total supplied HC amount inhc/total") from the start of the adsorption mode, i.e., the start of operation of the internal combustion engine 1 in STEP13. The instantaneous adsorbed amount hc/trp and the integrated adsorbed amount shc/trp are related to the first and third evaluating processes, respectively.

The instantaneous adsorbed amount hc/trp is determined according to the following equation (11):

$$hc/trp(k) = DHCHAT(k) \cdot trs/sv \cdot k/hc \quad (11)$$
$$= (VS1(k) - VS2/HAT(k)) \cdot trs/sv \cdot k/hc$$

Specifically, the HC concentration estimated difference DHCHAT(k) which is the difference (=VS1(k)–VS2/HAT(k)) between the present output VS1(k) of the upstream air-fuel ratio sensor 28 sampled in STEP2 and the estimated output VS2/HAT(k) of the downstream air-fuel ratio sensor 29 determined in STEP10 is multiplied by the present exhaust gas volume trs/sv determined in STEP4 and a corrective coefficient k/hc that is determined as described below, thereby determining the instantaneous adsorbed amount hc/trp in the present control cycle.

Figure 10:
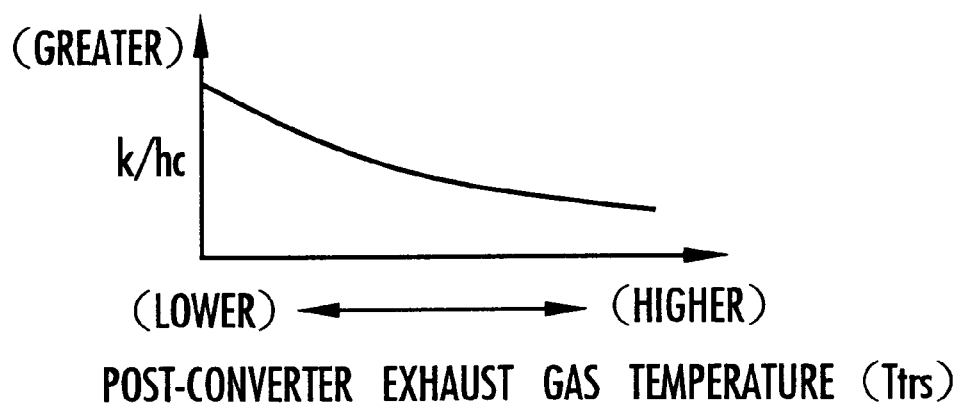
FIG. 10 is a diagram showing a data table used in the operation sequence shown in FIG. 4.

The corrective coefficient k/hc is determined from the present temperature of the exhaust gas that has passed through the catalytic converter 11, i.e., the exhaust gas to flow into the second exhaust passage 17, based on a predetermined data table shown in FIG. 10. The corrective coefficient k/hc is determined such that it is smaller as the temperature of the exhaust gas is higher. In the present embodiment, the adsorbent temperature Ttrs detected in STEP1 is substituted for the present temperature of the exhaust gas that is used to determine the corrective coefficient k/hc.

The equation (11) will further be described below. The HC concentration estimated difference DHCHAT corresponds to the difference between the concentrations of HC at the respective air-fuel ratio sensors 28, 29, i.e., at locations upstream and downstream of the HC adsorbent 12. Basically, therefore, the HC concentration estimated difference DHCHAT multiplied by the exhaust gas volume trs/sv represents the amount of HC adsorbed by the HC adsorbent 12 in each control cycle in the adsorption mode. The density of HC in the exhaust gas is smaller as the temperature of the exhaust gas is higher.

According to the present embodiment, the product of the HC concentration estimated difference DHCHAT(k) and the exhaust gas volume trs/sv is further multiplied by the corrective coefficient k/hc that has been determined according to the data table shown in FIG. 10, thus determining an instantaneous adsorbed amount hc/trp(k) in each control cycle.

The instantaneous adsorbed amount hc/trp thus determined is highly accurate.

A new integrated adsorbed amount shc/trp(k) is determined by adding the instantaneous adsorbed amount hc/trp(k) determined in the present control cycle as described above to a preceding value shc/trp(k−1) of the integrated adsorbed amount determined in the preceding control cycle, according to the following equation (12):

$$shc/trp(k)=shc/trp(k-1)+hc/trp(k) \quad (12)$$

Since the integrated adsorbed amount shc/trp is initialized to "0" immediately before the internal combustion engine 1 starts to operate (STEP6), the integrated adsorbed amount shc/trpfk) determined in STEP13 is indicative of a total amount of HC newly adsorbed by the HC adsorbent 12 after the internal combustion engine 1 has started to operate, i.e., from the start of the adsorption mode, until the present control cycle. The integrated adsorbed amount shc/trp has its value fixedly held, i.e., its value is determined, when the adsorption mode is finished as described later on.

A new total adsorbed HC amount hcm/hat(k) is determined by adding the instantaneous adsorbed amount hc/trp(k) determined in the present control cycle to a preceding value hcm/hat(k−1) of the total adsorbed HC amount determined in the preceding control cycle, according to the following equation (13):

$$hcm/hat(k)=hcm/hat(k-1)+hc/trp(k) \quad (13)$$

When the HC is desorbed from the HC adsorbent 12, the desorbed amount of HC in each control cycle is successively subtracted from the value of the total adsorbed HC amount hcm/hat. The total adsorbed HC amount hcm/hat is not initialized to "0" immediately before the internal combustion engine 1 starts to operate, unlike the integrated adsorbed amount shc/trp, and its value is stored in a nonvolatile memory such as an EEPROM or the like when the internal combustion engine 1 is shut down. The stored value is used as an initial value when the total adsorbed HC amount hcm/hat is to be determined according to the equation (13) after the internal combustion engine 1 starts operating next time.

Thus, the total adsorbed HC amount hcm/hat is indicative of the total amount of HC that is actually adsorbed by the HC adsorbent 12. In the present embodiment, the total adsorbed HC amount hcm/hat is used to recognize the amount of HC already adsorbed by the HC adsorbent 12 when the internal combustion engine 1 starts operating, i.e., the total adsorbed HC amount hcm/hat finally determined when the internal combustion engine 1 has operated previously.

The value of the total adsorbed HC amount hcm/hat at the time the internal combustion engine 1 starts operating is stored in a memory each time the internal combustion engine 1 operates.

A new total supplied HC amount inhc/total(k) is determined by adding the product (ex/hc·trs/sv·k/hc) of the present post-converter HC concentration estimated value ex/hc determined in STEP3, the present exhaust gas volume trs/sv determined in STEP4, and the corrective coefficient k/hc (determined from the data table shown in FIG. 10) used to determine the instantaneous adsorbed amount hc/trp(k) in STEP13, to a preceding value inhc/total(k−1) of the total supplied HC amount determined in the preceding control cycle, according to the following equation (14):

$$inhc/total(k)=inhc/total(k-1)+(ex/hc·trs/sv·k/hc) \quad (14)$$

The product (ex/hc·trs/sv·k/hc) in the equation (14) signifies the amount of HC in the exhaust gas supplied per unit time to the HC adsorbent 12 in the second exhaust passage 17, according to the same idea as in the determination of the instantaneous adsorbed amount hc/trp(k). Inasmuch as the total supplied HC amount inhc/total is initialized to "0" immediately before the internal combustion engine 1 starts to operate (STEP6), the total supplied HC amount inhc/total(k) determined in STEP13 is indicative of a total amount (integrated value) of HC supplied to the HC adsorbent 12 in the second exhaust passage 17 after the internal combustion engine 1 has started to operate, i.e., from the start of the adsorption mode, until the present control cycle.

After having determined the instantaneous adsorbed amount hc/trp(k), the integrated adsorbed amount shc/trp(k), the total adsorbed HC amount hcm/hat(k), and the total supplied HC amount inhc/total(k) in the present control cycle, the purifying system controller 32 performs a process of evaluating a deteriorated state of the HC adsorbent 12 based on the instantaneous adsorbed amount hc/trp(k) in STEP14 shown in FIG. 5.

This process is based on the first evaluating process, and decides whether the HC adsorbent 12 is in a deteriorated state or not by comparing the instantaneous adsorbed amount hc/trp(k) determined in each control cycle in the adsorption mode with a predetermined threshold (hereinafter referred to as "first deterioration decision threshold trs/agdlmt1") set up as described below. The process is carried out according to a subroutine shown in FIG. 11.

Figure 11:
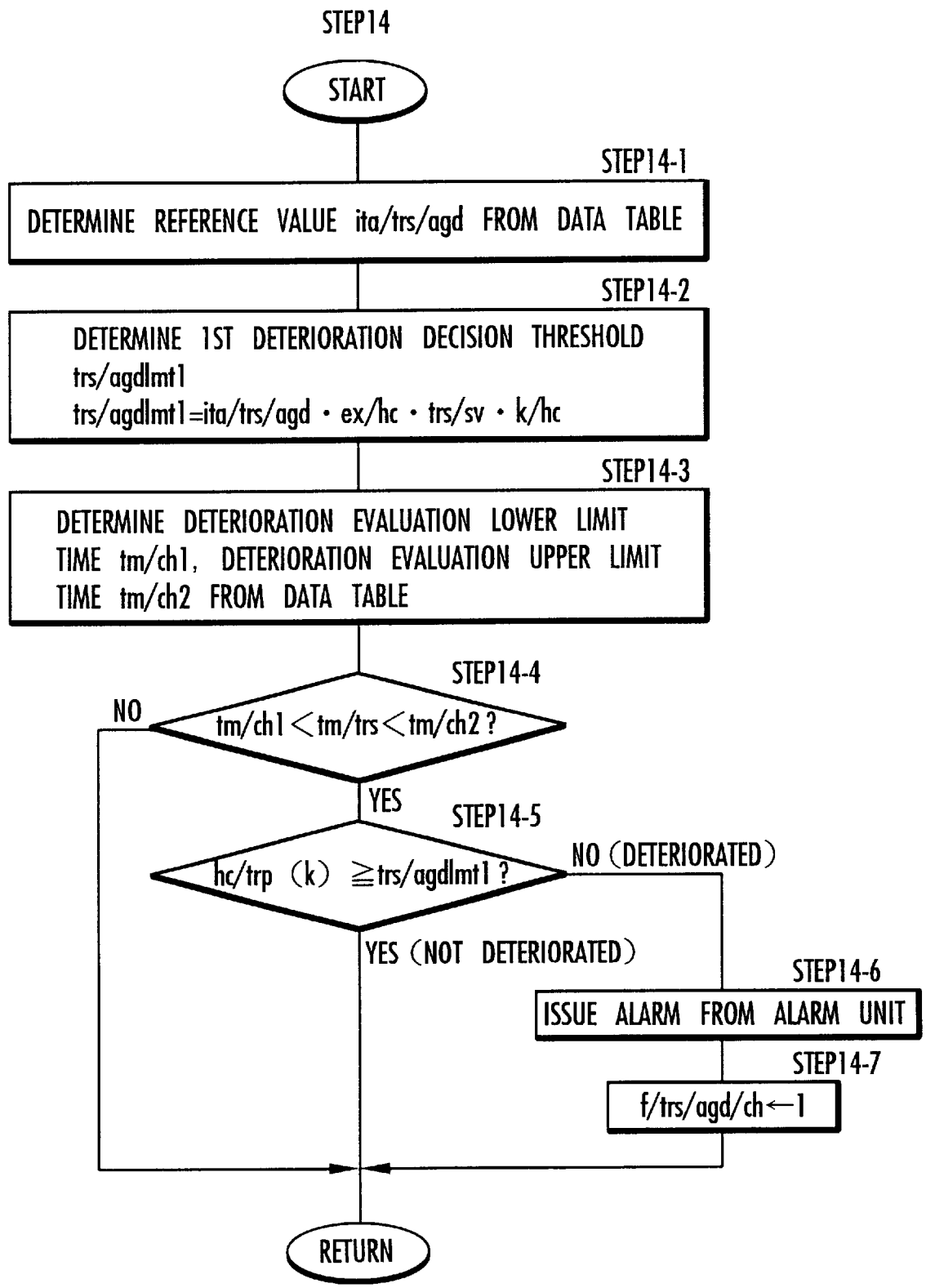
FIG. 11 is a flowchart of a subroutine of the operation sequence shown in FIG. 5.
Figure 12:
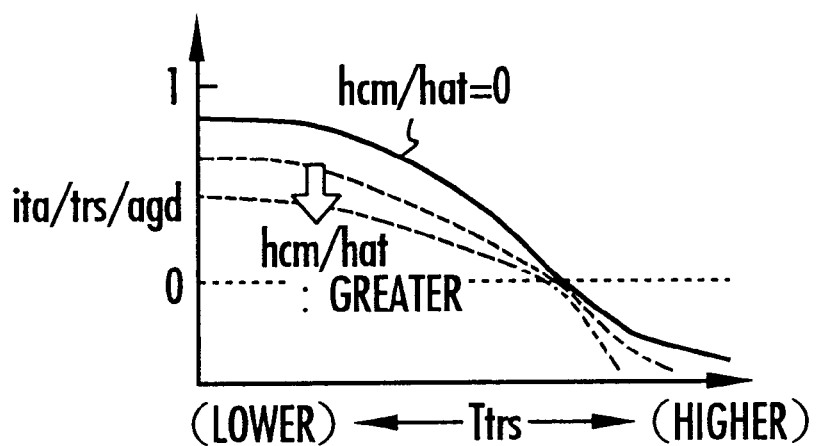
FIG. 12 is a diagram showing a data table used in the subroutine shown in FIG. 11.

In FIG. 11, the purifying system controller 32 determines a reference value ita/trs/agd serving as a basis for determining the first deterioration decision threshold trs/agdlmt1 from the present adsorbent temperature Ttrs detected in STEP1 and the present total adsorbed HC amount hcm/hat(k) determined in STEP13, based on a predetermined data table shown in FIG. 12, in STEP14-1.

The reference value ita/trs/agd corresponds to the ratio of a standard amount of HC which can be adsorbed by the HC adsorbent 12 that is not deteriorated in the adsorption mode, to the total amount of HC in the exhaust gas that is supplied to the second exhaust passage 17 per unit time. When the reference value ita/trs/agd is ita/trs/agd=1, it means that the HC adsorbent 12 can adsorb the entire amount of HC in the exhaust gas that is supplied.

The amount of HC which can be adsorbed by the HC adsorbent 12 per unit time (per control cycle) in the adsorption mode is basically reduced as the temperature of the HC adsorbent 12 is higher. The amount of HC which can be adsorbed by the HC adsorbent 12 per unit time is reduced as the amount of HC already adsorbed by the HC adsorbent 12 is increased.

The data table shown in FIG. 12 is established such that as the adsorbent temperature Ttrs becomes higher, the reference value ita/trs/agd becomes smaller, and that as the total adsorbed HC amount hcm/hat(k) representative of the total amount of HC actually adsorbed to the HC adsorbent 12 in each control cycle becomes greater, the reference value ita/trs/agd becomes smaller.

Then, in STEP14-2, the purifying system controller 32 determines the first deterioration decision threshold trs/agdlmt1 by multiplying the reference value ita/trs/agd by the present post-converter HC concentration estimated value ex/hc determined in STEP3, the present exhaust gas volume trs/sv determined in STEP4, and the corrective coefficient k/hc (determined from the data table shown in FIG. 10) used to determine the instantaneous adsorbed amount hc/trp(k) in STEP13, according to the following equation (15):

$$\text{trs/agdlmt1} = \text{ita/trs/agd} \cdot \text{ex/hc} \cdot \text{trs/sv} \cdot \text{k/hc} \tag{15}$$

The product (ex/hc·trs/sv·k/hc) in the equation (15) signifies the amount of HC in the exhaust gas supplied per unit time to the HC adsorbent 12 in the second exhaust passage 17. Therefore, the first deterioration decision threshold trs/agdlmt1 determined according to the equation (15) corresponds to the amount of HC which can be adsorbed by the HC adsorbent 12 that is not deteriorated per unit time.

After having determined the first deterioration decision threshold trs/agdlmt1, in order to limit a period for evaluating a deteriorated state of the HC adsorbent 12 based on the instantaneous adsorbed amount hc/trp within a predetermined period in the adsorption mode, the purifying system controller 32 sets a value tm/ch1 (hereinafter referred to as "deterioration evaluation lower limit time tm/ch1") of the after-engine-start elapsed time tm/trs at the start of the predetermined period (hereinafter referred to as "evaluation execution period") and a value tm/ch2 (hereinafter referred to as "deterioration evaluation lower limit time tm/ch2") of the after-engine-start elapsed time tm/trs at the end of the evaluation execution period in STEP14-3.

According to the present embodiment, therefore, a deteriorated state of the HC adsorbent 12 based on the instantaneous adsorbed amount hc/trp is evaluated only within an evaluation execution period in which the after-engine-start elapsed time tm/trs is in the range of tm/ch1 <tm/trs<tm/ch2. This is because immediately after the H adsorbent 12 starts to adsorb HC or immediately before the adsorption of HC by the H adsorbent 12 ends, i.e., immediately before the H adsorbent 12 is saturated and unable to adsorb HC, the reliability of instantaneous adsorbed amount hc/trp determined in STEP13 is considered to be low.

Figure 13:
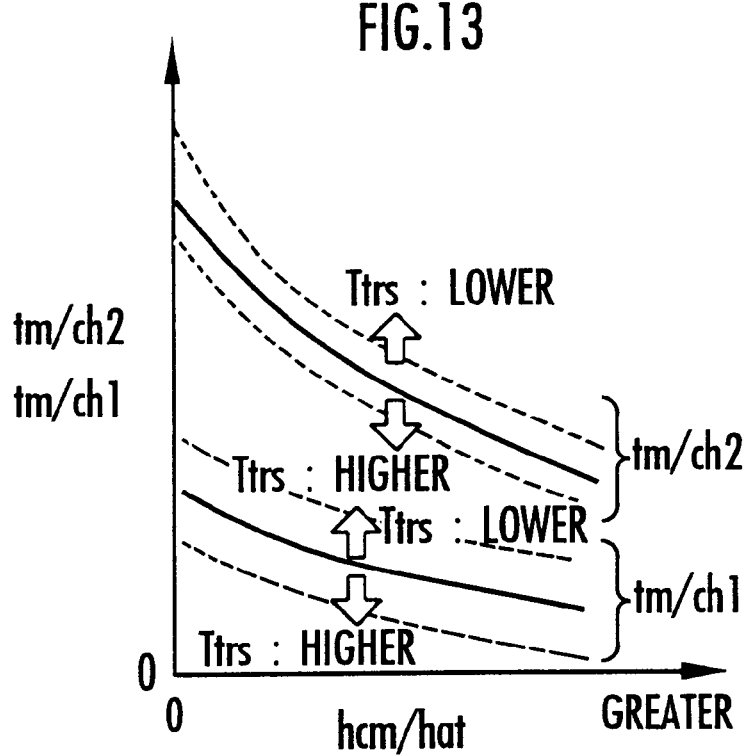
FIG. 13 is a diagram showing a data table used in the subroutine shown in FIG. 11.

The deterioration evaluation lower limit time tm/ch1 and the deterioration evaluation lower limit time tm/ch2 are determined from the adsorbent temperature Ttrs at the start of operation of the internal combustion engine 1, i.e., at the start of the adsorption mode, and the total adsorbed HC amount hcm/hat at the start of operation of the internal combustion engine 1, which corresponds to the total amount of HC which has not been desorbed from the HC adsorbent 12 and has remained in the HC adsorbent 12 when the internal combustion engine 1 has operated previously, based on a data table shown in FIG. 13.

The HC adsorbent 12 is saturated earlier as the total adsorbed HC amount hcm/hat at the start of operation of the internal combustion engine 1 is greater or the adsorbent temperature Ttrs at the start of operation of the internal combustion engine 1 is higher. Furthermore, if the HC adsorbent 12 has adsorbed a certain amount of HC or has been warmed to a certain extent at the start of operation of the internal combustion engine 1, then the HC adsorbent 12 tends to adsorb HC smoothly.

The data table shown in FIG. 13 is determined such that as the total adsorbed HC amount hcm/hat at the start of operation of the internal combustion engine 1, i.e., at the start of the absorption mode, is greater, the deterioration evaluation lower limit time tm/ch1 and the deterioration evaluation lower limit time tm/ch2 are smaller, and that as the adsorbent temperature Ttrs at the start of operation of the internal combustion engine 1 is higher, the deterioration evaluation lower limit time tm/ch1 and the deterioration evaluation lower limit time tm/ch2 are smaller. Therefore, as the total adsorbed HC amount hcm/hat and the adsorbent temperature Ttrs at the start of operation of the internal combustion engine 1, i.e., at the start of the absorption mode, are greater, the evaluation of a deteriorated state of the HC adsorbent 12 based on the instantaneous adsorbed amount hc/trp is started earlier and ended earlier.

After having set the deterioration evaluation lower limit time tm/ch1 and the deterioration evaluation lower limit time tm/ch2, the purifying system controller 32 decides whether the present after-engine-start elapsed time tm/trs is in the evaluation execution period of tm/ch1<tm/trs<tm/ch2 or not in STEP14-4.

If the present after-engine-start elapsed time tm/trs is not in the evaluation execution period, then control returns to the main routine shown in FIG. 5 without evaluating a deteriorated state of the HC adsorbent 12.

If the present after-engine-start elapsed time tm/trs is in the evaluation execution period, then the purifying system controller 32 compares the present instantaneous adsorbed amount hc/trp(k) with the first deterioration decision threshold trs/agdlmt1 determined in STEP14-2, in STEP14-5.

If hc/trp(k)>trs/agdlmt1, then the purifying system controller 32 judges the HC adsorbent 12 as being not deteriorated, and control returns to the main routine shown in FIG. 5 without performing any special process.

If hc/trp(k)<trs/agdlmt1, then the purifying system controller 32 judges the HC adsorbent 12 as being deteriorated, and controls the alarm unit 31 to issues an alarm indicative of the deteriorated state of the HC adsorbent 12 in STEP14-6.

The purifying system controller 32 sets a flag f/trs/agd/ch (hereinafter referred to as "deterioration detected flag f/trs/agd/ch") to "1" in STEP14-7. The deterioration detected flag f/trs/agd/ch is "1" when it indicates that the HC adsorbent 12 is deteriorated, and "0" when it indicates that the HC adsorbent 12 is not deteriorated. Thereafter, control returns to the main routine shown in FIG. 5.

The value of the deterioration detected flag f/trs/agd/ch is stored in a nonvolatile memory such as an EEPROM or the like even when the internal combustion engine 1 is shut down. Once the value of the deterioration detected flag f/trs/agd/ch is set to "1", it cannot be cleared to "0" unless the HC adsorbent 12 is replaced by the serviceman or the like. The alarm unit 31 continuously issues an alarm while the internal combustion engine 1 is in operation insofar as f/trs/agd/ch=1.

Referring back to FIG. 5, after having evaluated a deteriorated state of the HC adsorbent 12 based on the instantaneous adsorbed amount hc/trp(k), the purifying system controller 32 compares the present instantaneous adsorbed amount hc/trp(k) with a predetermined value X/HC/LMT near "0" to decide whether the HC adsorbent 12 is saturated or not, i.e., whether the HC adsorbent 12 is in a state almost incapable of adsorbing HC or not, in STEP15.

If hc/trp(k)>X/HC/LMT, then the HC adsorbent 12 is in a state capable of still adsorbing HC, and if hc/trp(k)<X/HC/LMT, then the HC adsorbent 12 is saturated. The predetermined value X/HC/LMT may basically be "0". However, in the present embodiment, the predetermined value X/HC/LMT is a negative value slightly smaller than "0" in view of the effect of noise.

If hc/trp(k)≧X/HC/LMT in STEP15, then the purifying system controller 32 holds the present after-engine-start elapsed time tm/trs as the value of the parameter dtrs in STEP16. The parameter dtrs is relative to the second evaluating process. If hc/trp(k)<X/HC/LMT in STEP15, i.e., if the HC adsorbent 12 is judged as being saturated, the parameter dtrs is held to the value of the after-engine-start elapsed time tm/trs in the preceding control cycle, i.e., is determined. Thus, the parameter dtrs is indicative of an elapsed time after the adsorption mode has started, i.e., after the internal combustion engine 1 has started to operate, until the HC adsorbent 12 is saturated. The parameter dtrs will hereinafter be referred to as "adsorption completion time dtrs".

After STEP16, the purifying system controller 32 compares the present after-engine-start elapsed time tm/trs with a predetermined value X/TM/LMT preset as a maximum time for the adsorption mode, i.e., an elapsed time from the start of operation of the internal combustion engine 1, in STEP17. The predetermined value X/TM/LMT is determined as a value for sufficiently activating the catalytic converter 11 within the period in which the after-engine-start elapsed time tm/trs reaches the predetermined value X/TM/LMT.

If the after-engine-start elapsed time tm/trs has not reached the predetermined value X/TM/LMT in STEP17, then the purifying system controller 32 performs the processing in STEP18 to control the switching valve mechanism 22 and set the flag f/hctrs/on, as described above. The second exhaust passage 17 is kept vented to the atmosphere, and the flag f/hctrs/on is set to "1", keeping the exhaust gas purifying system in the adsorption mode. After STEP18, the processing of the present control cycle is finished.

If hc/trp(k)<X/HC/LMT, i.e., if the HC adsorbent 12 is saturated, in STEP15, or if the after-engine-start elapsed time tm/trs is in excess of the predetermined value X/TM/LMT in STEP17, then the purifying system controller 32 determines a threshold trs/agdlmt2 (hereinafter referred to as "second deterioration decision threshold trs/agdlmt2") to be compared with the adsorption completion time dtrs based on the second evaluating process, and a threshold trs/agdlmt3 (hereinafter referred to as "third deterioration decision threshold trs/agdlmt3") to be compared with the integrated adsorbed amount shc/trp (more specifically, the integrated adsorbed amount shc/trp in a control cycle in which the condition of STEP15 or STEP17 is satisfied) based on the third evaluating process, in STEP19.

Figure 14:
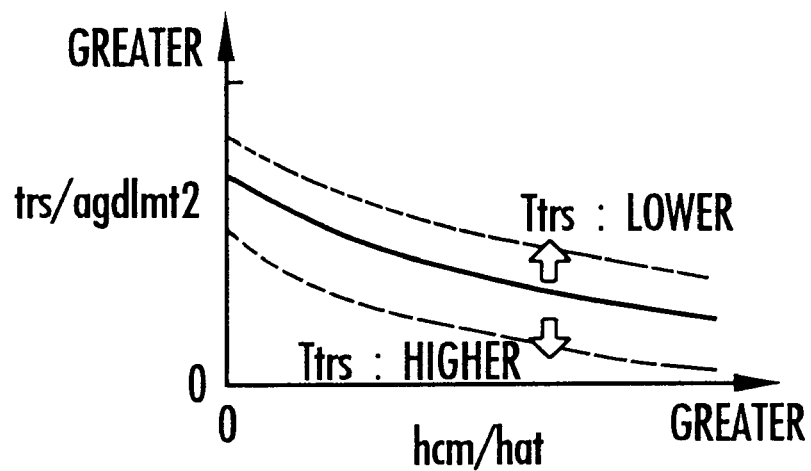
FIG. 14 is a diagram showing a data table used in the operation sequence shown in FIG. 5.

The second deterioration decision threshold trs/agdlmt2 is determined from the total adsorbed HC amount hcm/hat and the adsorbent temperature Ttrs at the start of operation of the internal combustion engine 1, i.e., at the start of the adsorption mode, based on a data table shown in FIG. 14.

The second deterioration decision threshold trs/agdlmt2 signifies a standard value of the adsorption completion time dtrs while the RC adsorbent 12 is not deteriorated. Since the adsorption completion time dtrs to be compared with the second deterioration decision threshold trs/agdlmt2 is a time after the start of the adsorption mode until the HC adsorbent 12 is saturated, as the total adsorbed HC amount hcm/hat at the start of the adsorption mode, i.e., the amount of HC already adsorbed by the HC adsorbent 12, is greater, the adsorption completion time dtrs is shorter. As the adsorbent temperature Ttrs at the start of the adsorption mode is higher, the adsorption completion time dtrs is shorter because the total amount of HC that can be adsorbed by the SC adsorbent 12 is smaller.

The data table shown in FIG. 14 is determined such that as the total adsorbed HC amount hcm/hat at the start of operation of the internal combustion engine 1, i.e., at the start of the adsorption mode, is greater, and as the adsorbent temperature Ttrs at the start of operation of the internal combustion engine 1 is higher, the second deterioration decision threshold trs/agdlmt2 is smaller.

The second deterioration decision threshold trs/agdlmt2 is may be set in view of the total adsorbed HC amount hcm/hat, the adsorbent temperature Ttrs, and the total supplied HC amount inhc/total in the present control cycle, which is the control cycle in which the adsorption mode is finished as described later on, or may be set in view of the total adsorbed HC amount hcm/hat, the total supplied HC amount inhc/total, and the adsorbent temperature Ttrs in the adsorption mode.

Figure 15:
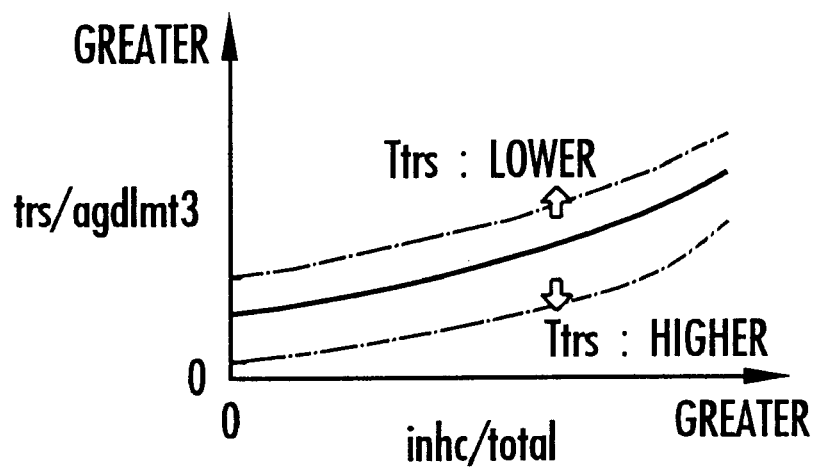
FIG. 15 is a diagram showing a data table used in the operation sequence shown in FIG. 5.

The third deterioration decision threshold trs/agdlmt3 is determined from the total supplied HC amount inhc/total in the present control cycle, which is the control cycle in which the adsorption mode is finished, and the adsorbent temperature Ttrs at the start of operation of the internal combustion engine 1, i.e., at the start of the adsorption mode, based on a data table shown in FIG. 15.

The third deterioration decision threshold trs/agdlmt3 signifies a standard value of the integrated adsorbed amount shc/trp (the integrated adsorbed amount shc/trp in a control cycle in which the condition of STEP15 or STEP17 is satisfied) while the HC adsorbent 12 is not deteriorated. The integrated adsorbed amount shc/trp is greater as the total supplied HC amount inhc/total indicative of the total amount of HC supplied to the HC adsorbent 12 in the adsorption mode is greater. As the adsorbent temperature Ttrs at the start of the adsorption mode is higher, the integrated adsorbed amount shc/trp is smaller because the total amount of HC that can be adsorbed by the HC adsorbent 12 is smaller.

The data table shown in FIG. 15 is determined such that as the total supplied HC amount inhc/total at the end of the adsorption mode is greater, the third deterioration decision threshold trs/agdlmt3 is larger, and as the adsorbent temperature Ttrs at the start of operation of the internal combustion engine 1 is higher, i.e., at the start of the adsorption mode, the third deterioration decision threshold trs/agdlmt3 is smaller.

The third deterioration decision threshold trs/agdlmt3 is also used as a threshold relative to the fourth evaluating process. The third deterioration decision threshold trs/agdlmt3 may be set depending on the total adsorbed HC amount hcm/hat at the end of the adsorption mode instead of the total supplied HC amount inhc/total. Furthermore, as with the second deterioration decision threshold trs/agdlmt2, the third deterioration decision threshold trs/agdlmt3 may be set depending on the total adsorbed HC amount hcm/hat at the at the start of the adsorption mode, i.e., at the start of operation of the internal combustion engine 1.

After having determined the second deterioration decision threshold trs/agdlmt2 and the third deterioration decision threshold trs/agdlmt3, the purifying system controller 32 controls the motor 26 of the switching valve mechanism 22 to rotate the valve disks 24, 25 to open and closed positions, respectively. Therefore, the first exhaust passage 15 is vented to the atmosphere, and the second exhaust passage 17 is shut off from the atmosphere in STEP20.

With the switching valve mechanism 22 thus operated, the exhaust gas from the internal combustion engine 1 is discharged via the first exhaust passage 15 into the atmosphere. Normally, no exhaust gas is supplied to the second exhaust passage 17 with the HC adsorbent 12 disposed therein.

In STEP20, the purifying system controller 32 sets the adsorption enable/disable flag f/hctrs/on to "0", canceling the adsorption mode. Furthermore, the purifying system controller 32 holds the present value of the after-engine-start elapsed time tm/trs as the value of a parameter tm/close indicative of the time at which the adsorption mode is finished (hereinafter referred to as "adsorption end time parameter tm/close").

After STEP20, the processing in the present control cycle is finished.

After the adsorption enable/disable flag f/hctrs/on is set to "0" and the adsorption mode is finished in STEP20, the adsorption enable/disable flag f/hctrs/on is "0" in STEP11 (see FIG. 4) in next and following control cycles.

Then, the purifying system controller 32 determines the value of a flag f/trs/purge (hereinafter referred to as "desorption completion flag f/trs/purge") in STEP21. The desorption completion flag f/trs/purge is "1" when it indicates that the desorption of HC adsorbed by the HC adsorbent 12 is completed, and "0" when it indicates that the desorption of HC adsorbed by the HC adsorbent 12 is not completed.

The desorption completion flag f/trs/purge has an initial value of "0". Immediately after the end of the adsorption mode, the desorption of HC adsorbed by the HC adsorbent 12 is not completed, and hence the desorption completion flag f/trs/purge is "0". If the desorption completion flag f/trs/purge is "0", then the purifying system controller 32 decides whether the internal combustion engine 1 is in exhaust gas recirculating operation (hereinafter referred to as "EGR operation") or not based on the operation status information of the internal combustion engine 1 that is supplied from the engine controller 27 in STEP22. If the desorption completion flag f/trs/purge is "1" in STEP21, then control proceeds to STEP26.

In the EGR operation, the solenoid-operated on/off valve 21 in the EGR passage 20 is opened to a certain opening to recirculate the exhaust gas from the internal combustion engine 1 via the EGR passage 20 and the intake pipe 7 into the combustion chamber 4 where unburned components of the exhaust gas are burned. While in the EGR operation, a portion of the exhaust gas from the internal combustion engine 1 that has passed through the catalytic converter 11 flows through the openings 18 in the first exhaust passage 15 into the second exhaust passage 17 under a negative pressure developed in the intake pipe 7, and then flows via the EGR passage 20 back into the intake pipe 7.

The time to open the solenoid-operated on/off valve 21 and the opening thereof in the EGR operation are controlled by the engine controller 27 depending on the rotational speed NE and the intake pressure PB.

If the internal combustion engine 1 is not in the EGR operation, i.e., if the solenoid-operated on/off valve 21 is closed, in STEP22, then the purifying system controller 32 holds the total adsorbed HC amount hcm/hat(k) in the present control cycle at the present value hcm/hat(k−1) that has been determined in the preceding control cycle in STEP23. Then, control goes to STEP26.

If the internal combustion engine 1 is in the EGR operation, i.e., if the solenoid-operated on/off valve 21 is open, in STEP22, then the purifying system controller 32 decides whether the present adsorbent temperature Ttrs is in excess of a predetermined temperature X/TMP/PRG or not in STEP24. The predetermined temperature X/TMP/PRG is a temperature at which HC starts being desorbed from the HC adsorbent 12, i.e., a lower limit temperature (ranging from about 250 to 400° C.) of the HC adsorbent 12 at which the HC adsorbent 12 is in the adsorption mode. Therefore, if the present adsorbent temperature Ttrs exceeds the predetermined temperature X/TMP/PRG, then the HC adsorbent 12 is in the adsorption mode.

If Ttrs≦X/TMP/PRG in STEP24, i.e., if the HC adsorbent 12 does not desorb the HC, then control goes to STEP23 and then STEP26.

If Ttrs>X/TMP/PRG in STEP24, then since the HC adsorbent 12 is in the adsorption mode and the exhaust gas is supplied to the second exhaust passage 17 in the EGR operation, the HC adsorbed by the HC adsorbent 12 is desorbed from the HC adsorbent 12. The purifying system controller 32 calculates an amount of HC desorbed from the HC adsorbent 12 in the present control cycle, i.e., an amount hc/prg of HC desorbed from the HC adsorbent 12 per control cycle (per unit time) (hereinafter referred to as "instantaneous desorbed amount hc/prg"), and an integrated desorbed amount shc/prg representing the integrated instantaneous desorbed amount hc/prg, and updates the total adsorbed HC amount hcm/hat in STEP25. In STEP25, the purifying system controller 32 also sets a value of the desorption completion flag f/trs/purge. The integrated desorbed amount shc/prg is related to the fourth evaluating process.

Figure 16:
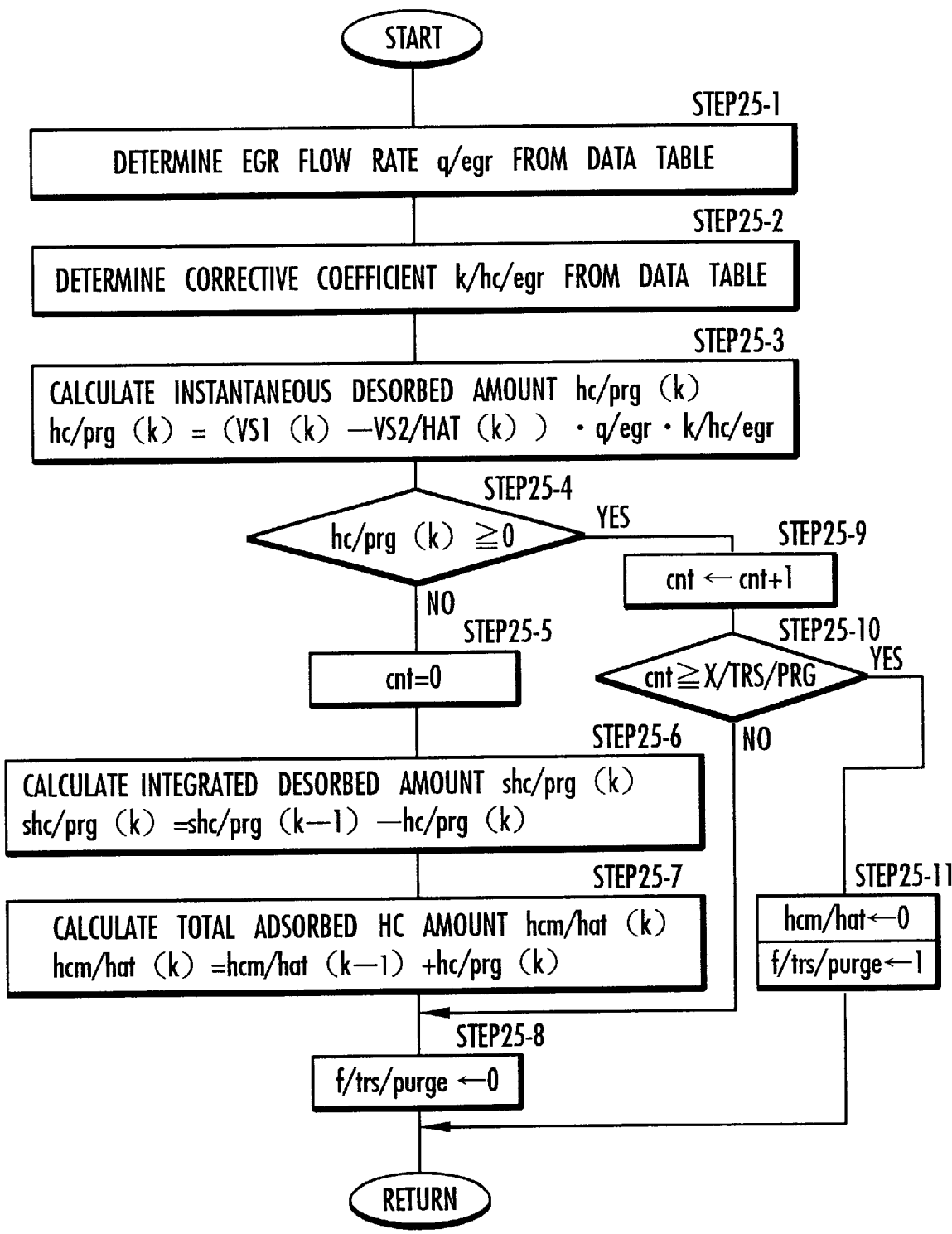
FIG. 16 is a flowchart of a subroutine of the operation sequence shown in FIG. 5.

The processing in STEP25 is carried out according to a subroutine shown in FIG. 16.

Figure 17:
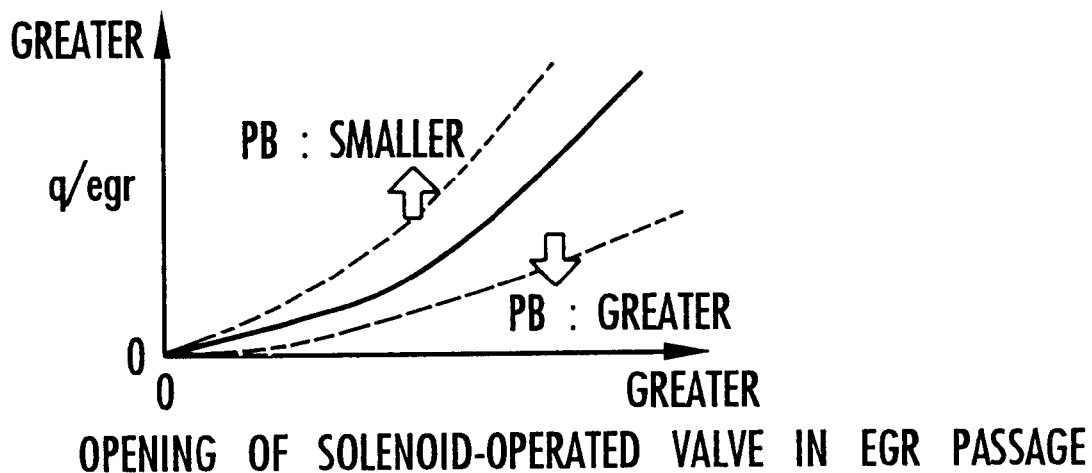
FIG. 17 is a diagram showing a data table used in the subroutine shown in FIG. 16.

Specifically, the purifying system controller 32 determines a flow rate q/egr of the exhaust gas that is recirculated via the EGR passage 20 to the intake pipe 7 (the flow rate is equal to a flow rate of the exhaust gas flowing through the second exhaust passage 17, and will hereinafter be referred to as "EGR flow rate q/egr") from the present opening (supplied from the engine controller 27) of the solenoid-operated on/off valve 21 in the EGR passage 20 and the present intake pressure PB, based on a predetermined data table shown in FIG. 17, in STEP25-1.

The EGR flow rate q/egr is greater as the opening of the solenoid-operated on/off valve 21 is greater. The EGR flow rate q/egr is also greater as the intake pressure PB is lower and hence the negative pressure in the intake pipe 7 is higher. Therefore, the data table shown in FIG. 17 is determined according to such a tendency with respect to the opening of the solenoid-operated on/off valve 21 and the intake pressure PB.

Figure 18:
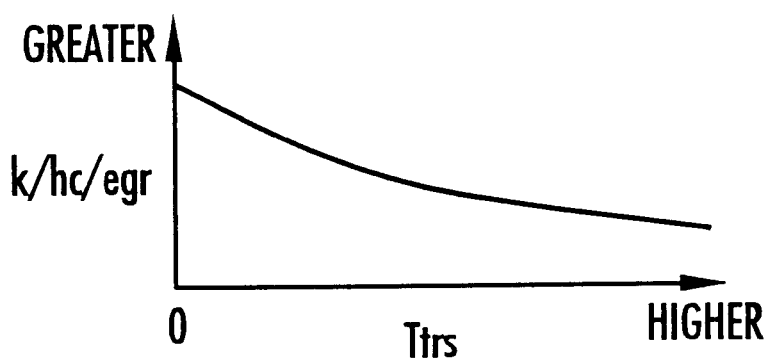
FIG. 18 is a diagram showing a data table used in the subroutine shown in FIG. 16.

Then, the purifying system controller 32 determines a corrective coefficient k/hc/egr relative to the density of HC in the exhaust gas from the present adsorbent temperature Ttrs, which corresponds to the temperature of the exhaust gas flowing through the second exhaust passage 17 and the EGR passage 20, based on a predetermined data table shown in FIG. 18, in STEP25-2.

The corrective coefficient k/hc/egr has the same technical significance as the corrective coefficient k/hc (see FIG. 10) used to determine the instantaneous adsorbed amount hc/trp in STEP13. The data table shown in FIG. 18 is determined such that the corrective coefficient k/hc/egr becomes smaller as the adsorbent temperature Ttrs corresponding to the temperature of the exhaust gas flowing through the second exhaust passage 17 is higher.

Then, in STEP25-3, the purifying system controller 32 determines the instantaneous desorbed amount hc/prg according to the same idea as in the determination of the instantaneous adsorbed amount hc/trp, according to the following equation (16):

$$hc/prg(k) = DHCHAT(k) \cdot q/egr \cdot k/hc/egr \qquad (16)$$
$$= (VS1(k) - VS2/HAT(k)) \cdot q/egr \cdot k/hc/egr$$

Specifically, the HC concentration estimated difference DHCHAT(k) which is the difference (=VS1(k)−VS2/HAT(k)) between the present output VS1(k) of the upstream air-fuel ratio sensor 28 sampled in STEP2 and the estimated output VS2/HAT(k) of the downstream air-fuel ratio sensor 29 determined in STEP10 is multiplied by the present EGR flow rate q/egr determined in STEP25-1 and the corrective coefficient k/hc/egr determined in STEP25-2, thereby determining the instantaneous desorbed amount hc/prg(k) in the present control cycle.

The instantaneous desorbed amount hc/prg thus determined is highly accurate.

When the HC is desorbed from the HC adsorbent 12 in the EGR operation, the HC concentration in the EGR operation is higher upstream of the HC adsorbent 12, i.e., at the location of the air-fuel ratio sensor 28, than downstream of the HC adsorbent 12, i.e., at the location of the air-fuel ratio sensor 29. Therefore, the HC concentration estimated difference DHCHAT(k) in the equation (16) is basically of a negative value. As a result, the instantaneous desorbed amount hc/prg(k) is also basically of a negative value.

Then, the purifying system controller 32 compares the present instantaneous desorbed amount hc/prg(k) determined in STEP25-3 with "0" in order to ascertain whether the desorption of the HC from the HC adsorbent 12 has been completed or not, i.e., whether all the HC adsorbed by the HC adsorbent 12 has been desorbed or not, in STEP25-4.

If the HC has been from the HC adsorbent 12, then hc/prg(k)<0 because the instantaneous desorbed amount hc/prg(k) is of a negative value. In this case, the purifying system controller 32 initializes the value of a desorption completion determining counter cnt to "0" in STEP25-5, and determines the integrated desorbed amount shc/prg(k) according to the following equation (17) in STEP25-6:

$$shc/prg(k)=shc/prg(k-1)-hc/prg(k) \qquad (17)$$

Specifically, the instantaneous desorbed amount hc/prg(k) determined in STEP25-4 is subtracted from the preceding value shc/pre(k−1), i.e., the value in the preceding control cycle, of the integrated desorbed amount shc/prg, thereby updating the integrated desorbed amount shc/prg and determining the integrated desorbed amount shc/prg(k) in the present control cycle. The instantaneous desorbed amount hc/prg(k) is subtracted in order to make the value of the integrated desorbed amount shc/prg positive.

Inasmuch as the integrated desorbed amount shc/prg is initialized to "0" immediately before the internal combustion engine 1 starts operating (see STEP6), the integrated desorbed amount shc/prg(k) determined in STEP25-7 is representative of the total amount of HC desorbed from the HC adsorbent 12 from the start of the desorption of the HC from the HC adsorbent 12 until the present control cycle, after the end of the adsorption mode. The integrated desorbed amount shc/prg has its value fixedly held, i.e., its value is determined, when the desorption of the HC from the HC adsorbent 12 is judged as being completed, as described later on.

Then, in STEP25-7, the purifying system controller 32 adds the instantaneous desorbed amount hc/prg(k) determined in the present control cycle to the preceding value hcm/hat(k−1) of the total adsorbed HC amount determined in the preceding control cycle, thus updating the total adsorbed HC amount hcm/hat to determine a new total adsorbed HC amount hcm/hat(k) according to the following equation (18):

$$hcm/hat(k)=hcm/hat(k-1)+hc/prg(k) \qquad (18)$$

Because hc/prg(k)<0, as the HC is desorbed from the HC adsorbent 12, the value of the total adsorbed HC amount hcm/hat(k) is reduced. Therefore, the total adsorbed HC amount hcm/hat determined in each control cycle upon desorption of the HC from the HC adsorbent 12 represents the amount of HC remaining in the HC adsorbent 12.

Then, the purifying system controller 32 sets the desorption completion flag f/trs/purge to "0" indicating that the desorption of the HC from the HC adsorbent 12 is not completed in STEP25-8. Thereafter, the control returns to the main routine shown in FIG. 5.

When the desorption of the HC from the HC adsorbent 12 is completed, the HC concentration upstream of the HC adsorbent 12 is substantially the same as the HC concentration downstream of the HC adsorbent 12. Thus, if hc/prg(k)>0 in STEP25-4, it can basically be determined that the desorption of the HC from the HC adsorbent 12 is completed. According to the present embodiment, in order to make the decision reliable, it is determined that the desorption of the HC from the HC adsorbent 12 is completed if the state of hc/prg(k)>0 continues for a predetermined time, i.e., the time of a predetermined number of control cycles.

If hc/prg(k)>0 in STEP25-4, then the value of the desorption completion determining counter cnt is incremented by "1" in STEP25-9.

Insofar as the state of hc/prg(k)≧0 continues in STEP25-4, the value of the desorption completion determining counter cnt is incremented by "1" in each control cycle. Therefore, the value of the desorption completion determining counter cnt represents the time for which the state of hc/prg(k)≧0 continues.

The purifying system controller 32 then compares the value of the desorption completion determining counter cnt with a predetermined value X/TRS/PRG in STEP25-10. If cnt<X/TRS/PRG, i.e., if the state of hc/prg(k)≧0 does not continue for a predetermined time corresponding to the predetermined value X/TRS/PRG, then the processing in STEP25-8 is executed to set the desorption completion flag f/trs/purge to "0", i.e., to determine that the desorption of the HC from the HC adsorbent 12 is not completed.

In the situation where the desorption of the HC from the HC adsorbent 12 is not completed in the state of hc/prg(k)≧0, in order to prevent the integrated desorbed amount shc/prg and the total adsorbed HC amount hcm/hat from being lowered in accuracy, the integrated desorbed amount shc/prg and the total adsorbed HC amount hcm/hat are not updated, i.e., the processing in STEP25-6 and STEP25-7 is not performed, but their present values are maintained. If hc/prg(k)<0 after hc/prg(k)≧0 and before cnt>X/TRS/PRG, i.e., if the HC is desorbed from the HC adsorbent 12, then the desorption completion determining counter cnt is reset to "0" in STEP25-5. In this case, the integrated desorbed amount shc/prg and the total adsorbed HC amount hcm/hat are calculated as described above.

If cnt≧X/TRS/PRG in STEP25-10, i.e., if the state of hc/prg(k)≧0 continues for the predetermined time corresponding to the predetermined value X/TRS/PRG, then the purifying system controller 32 determines that the desorption of the HC from the HC adsorbent 12 is completed, and initializes the value of the total adsorbed HC amount hcm/hat to "0" and sets the value of the desorption completion flag f/trs/purge to "1" in STEP25-11. Then, control returns to the main routine shown in FIG. 5.

The value of the total adsorbed HC amount hcm/hat is initialized to "0" in STEP25-11 in order to prevent an error thereof from being accumulated. The total adsorbed HC amount hcm/hat is initialized to "0" only when the desorption of the HC from the HC adsorbent 12 is judged as being completed, and is not initialized to "0" in other situations including the shutdown of the internal combustion engine 1. Therefore, if the internal combustion engine 1 is shut down before the desorption of the HC from the HC adsorbent 12 is completed, the value (>0) of the total adsorbed HC amount hcm/hat at the shutdown of the internal combustion engine 1 is maintained until the adsorption mode is started when the internal combustion engine 1 is operated next time. Normally, however, the desorption of the HC from the HC adsorbent 12 is completed while the internal combustion engine 1 is operating in one session. Consequently, the value of the total adsorbed HC amount hcm/hat at the start of operation of the internal combustion engine 1, i.e., at the start of the adsorption mode, is normally "0" (in this case, the total adsorbed HC amount hcm/hat and the integrated adsorbed amount shc/trp determined in the adsorption mode agree with each other).

By thus determining the total adsorbed HC amount hcm/hat, the purifying system controller 32 can accurately recognize the total amount of HC adsorbed by the HC adsorbent 12 at any arbitrary time.

After STEP25, or if f/trs/purge=1, i.e., if the desorption of the HC from the HC adsorbent 12 is completed, in STEP21, or if the internal combustion engine 1 is not in the EGR operation, i.e., if the solenoid-operated on/off valve 21 is closed, in STEP22, or if Ttrs≦x/tmp/prg, i.e., if the HC is not desorbed from the HC adsorbent 12, in STEP24, then the purifying system controller 32 performs the processing in STEP26, described below, and then the processing in the present control cycle is finished.

In STEP26, the purifying system controller 32 evaluates a deteriorated state of the HC adsorbent 12 based on the integrated adsorbed amount shc/trp finally determined in the adsorption mode, i.e., based on the third evaluating process, evaluates a deteriorated state of the HC adsorbent 12 based on the adsorption completion time dtrs finally determined in the adsorption mode, i.e., based on the second evaluating process, and evaluates a deteriorated state of the HC adsorbent 12 based on the integrated desorbed amount shc/prg finally determined in STEP25, i.e., the integrated desorbed amount shc/prg at the time the HC desorption is judged as being completed, i.e., based on the fourth evaluating process.

Figure 19:
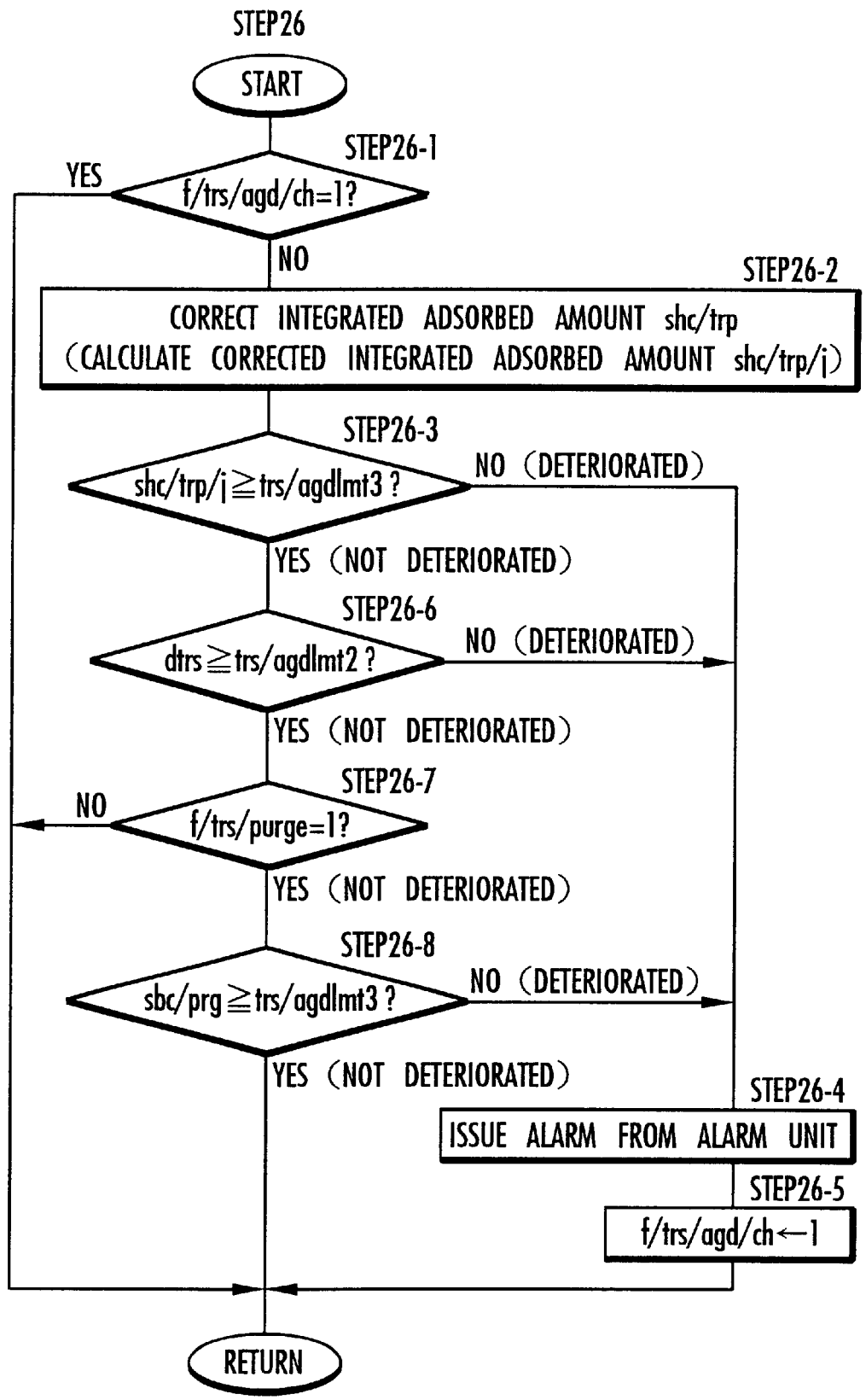
FIG. 19 is a flowchart of a subroutine of the operation sequence shown in FIG. 5.

The evaluating process in STEP26 is carried out according to a subroutine shown in FIG. 19.

Specifically, the purifying system controller 32 determines the value of the deterioration detected flag f/trs/agd/ch in STEP26-1. If f/trs/agd/ch=1, i.e., if the HC adsorbent 12 is judged as being deteriorated, e.g., based on the instantaneous adsorbed amount hc/trp in the adsorption mode, then control immediately goes back to the main routine shown in FIG. 5.

If f/trs/agd/ch=0, i.e., if the HC adsorbent 12 is not judged as being deteriorated, then the purifying system controller 32 determines, in STEP26-2, a corrected integrated absorbed amount shc/trp/j by correcting the integrated adsorbed amount shc/trp finally determined at the time the adsorption mode is finished, as follows:

The purifying system controller 32 corrects the integrated adsorbed amount shc/trp by increasing the value of the integrated adsorbed amount shc/trp by an amount of HC that the HC adsorbent 12 is expected to have adsorbed when the air-fuel ratio sensors 28, 29 are not activated (in this state, the instantaneous adsorbed amount hc/trp(k) determined in STEP13 is almost "0" and hence the integrated adsorbed amount shc/trp(k) is also maintained at almost "0"), according to the following equation (19):

$$shc/trp/j = shc/trp \cdot \frac{tm/close}{tm/close - tm/s/act} \qquad (19)$$

Specifically, at the end of the adsorption mode, the purifying system controller 32 divides the value of the adsorption end time parameter tm/close by a value (=tm/close−tm/s/act) that is produced by subtracting the sensor activation time parameter tm/s/act (see STEP9) which represents the value of the after-engine-start elapsed time tm/trs at the time both the air-fuel ratio sensors 28, 29 are activated from the adsorption end time parameter tm/close set in STEP20, i.e., the value of the after-engine-start elapsed time tm/trs at the end of the adsorption mode. Then, the purifying system controller 32 multiplies the integrated adsorbed amount shc/trp at the end of the adsorption mode by the produced value (≧1), thus determining the corrected integrated absorbed amount shc/trp/j.

The corrected integrated absorbed amount shc/trp/j thus determined agrees accurately with the total amount of HC adsorbed by the HC adsorbent 12 from the start to the end of the adsorption mode.

Then, the purifying system controller 32 compares the corrected integrated absorbed amount shc/trp/j with the third deterioration decision threshold trs/agdlmt3 determined in STEP19 at the end of the adsorption mode in STEP26-3.

If shc/trp/j<trs/agdlmt3, then the purifying system controller 32 determines that the total amount of HC adsorbed by the HC adsorbent 12 in the adsorption mode is smaller than normal, and the HC adsorbent 12 is deteriorated. In this case, as with STEP14-6 and STEP14-7 shown in FIG. 11, the purifying system controller 32 controls the alarm unit 31 to issues an alarm indicative of the deteriorated state of the HC adsorbent 12 in STEP26-4, and sets the deterioration detected flag f/trs/agd/ch") to "1" in STEP26-5. Thereafter, control returns to the main routine shown in FIG. 5.

If shc/trp/j 2 trs/agdlmt3 in STEP26-3, then the purifying system controller 32 compares the adsorption completion time dtrs finally determined at the end of the adsorption mode with the second deterioration decision threshold trs/agdlmt2 determined in STEP19 in STEP26-6.

If dtrs<trs/agdlmt2, then the purifying system controller 32 determines that the time required from the start of the adsorption mode until the HC adsorbent 12 is saturated is shorter than normal, and the HC adsorbent 12 is deteriorated. In this case, the purifying system controller 32 performs the processing in STEP26-4 and STEP26-5, and then control returns to the main routine shown in FIG. 5. That is, the purifying system controller 32 controls the alarm unit 31 to issues an alarm indicative of the deteriorated state of the HC adsorbent 12, and sets the deterioration detected flag f/trs/agd/ch") to "1".

If dtrs>trs/agdlmt2 in STEP26-6, then the purifying system controller 32 determines the value of the desorption completion flag f/trs/purge in STEP26-7. If f/trs/purge=0, indicating that the desorption of the HC from the HC adsorbent 12 is not completed, then control returns to the main routine shown in FIG. 5.

If f/trs/purge=1, indicating that the desorption of the HC from the HC adsorbent 12 is completed, then the purifying system controller 32 compares the integrated desorbed amount shc/prg determined in STEP25 with the third deterioration decision threshold trs/agdlmt3 in STEP26-8.

The integrated desorbed amount shc/prg finally determined until the desorption of the HC from the HC adsorbent 12 is completed is basically substantially equal to the total amount of HC adsorbed by the HC adsorbent 12 in the adsorption mode, i.e., the corrected integrated absorbed amount shc/trp/j or the integrated absorbed amount shc/trp. According to the present embodiment, therefore, for evaluating a deteriorated state of the HC adsorbent 12 based on the integrated desorbed amount shc/prg, the integrated desorbed amount shc/prg is compared with the third deterioration decision threshold trs/agdlmt3 in the same manner as with the evaluation of a deteriorated state of the HC adsorbent 12 based on the corrected integrated absorbed amount shc/trp in STEP26-3. An exclusive threshold to be compared with the integrated desorbed amount shc/prg may be set independently of the third deterioration decision threshold trs/agdlmt3.

If shc/prg<trs/agdlmt3, then the purifying system controller 32 determines that the HC adsorbent 12 is deteriorated in the same manner as with the evaluation of a deteriorated state of the HC adsorbent 12 based on the corrected integrated absorbed amount shc/trp. After the purifying system controller 32 has performed the processing in STEP26-4 and STEP26-5, control returns to the main routine shown in FIG. 5. Specifically, the purifying system controller 32 controls the alarm unit 31 to issues an alarm indicative of the deteriorated state of the HC adsorbent 12, and sets the deterioration detected flag f/trs/agd/ch") to "1". If shc/prg≧trs/agdlmt3, then the purifying system controller 32 determines that the HC adsorbent 12 is not deteriorated, and control returns to the main routine shown in FIG. 5.

The details of the operation sequence of the purifying system controller have been described above.

In the present embodiment, the processing in STEP26 is repeatedly carried out in the control cycles of the purifying system controller 32 after the end of the adsorption mode. The adsorption completion time dtrs, the integrated absorbed amount shc/trp, and the corrected integrated absorbed amount shc/trp/j relative to the second and third evaluating processes are determined at the end of the adsorption mode. Therefore, the evaluation of a deteriorated state of the HC adsorbent 12 based on the adsorption completion time dtrs (the second evaluating process) and the evaluation of a deteriorated state of the HC adsorbent 12 based on the corrected integrated absorbed amount shc/trp/j (the third evaluating process) may be carried out in STEP19.

Though not shown in the illustrated flowcharts, the evaluation of a deteriorated state of the HC adsorbent 12 is not carried out if the temperature of the HC adsorbent 12 has already been increased to a temperature at which it cannot adsorb HC when the internal combustion engine 1 starts to operate, as when the internal combustion engine 1 resumes its operation immediately after it has been shut down.

In the exhaust gas purifying system according to the present embodiment, as described above, while in the adsorption mode to adsorb HC with the HC adsorbent 12 or when the adsorbed HC is desorbed from the HC adsorbent 12, an amount hc/trp of HC adsorbed by the HC adsorbent 12 per unit time (per control cycle) and an amount hc/prg of HC desorbed from the HC adsorbent 12 per unit time (per control cycle) are determined based on the HC concentration estimated difference DHCHAT (=VS1–VS2/HAT) as the difference between the outputs of the upstream air-fuel ratio sensor 28 and the downstream air-fuel ratio sensor 29.

At this time, the HC concentration estimated difference DHCHAT that is the difference between the actual output VS1 of the upstream air-fuel ratio sensor 28 and the estimated output VS2/HAT of the downstream air-fuel ratio sensor 29 which is determined by the estimator 34 using the identified values of the model parameters a1–a4, b1 that are successively identified by the identifier 33 is used as the difference between the outputs of the air-fuel ratio sensors 28, 29. The instantaneous adsorbed amount hc/trp and the instantaneous desorbed amount hc/prg are determined by multiplying the HC concentration estimated difference DHCHAT by the flow rate of the exhaust gas and the corrective coefficient depending on the temperature of the exhaust gas according to the equations (11), (16). In this manner, the instantaneous adsorbed amount hc/trp and the instantaneous desorbed amount hc/prg can accurately be determined without being affected by components of the exhaust gas other than HC.

The instantaneous adsorbed amount hc/trp, the integrated adsorbed amount shc/trp (more specifically, the corrected integrated adsorbed amount shc/trp/j) determined base on the instantaneous adsorbed amount hc/trp, the adsorption completion time dtrs, and the integrated desorbed amount shc/prg determined based on the instantaneous desorbed amount hc/prg are compared with the thresholds determined depending on the temperature of the HC adsorbent 12, i.e., the first through third deterioration decision thresholds trs/agdlmt1, trs/agdlmt2, trs/agdlmt3) to evaluate a deteriorated state of the HC adsorbent 12. Therefore, a deteriorated state of the HC adsorbent 12 can be evaluated accurately and appropriately.

The present invention is not limited to the illustrated embodiment, but may be modified as follows:

In the above embodiment, a deteriorated state of the HC adsorbent 12 is evaluated based on all of the instantaneous adsorbed amount hc/trp, the integrated adsorbed amount shc/trp, the adsorption completion time dtrs, and the integrated desorbed amount shc/prg, i.e., based on all of the first through fourth evaluating processes. However, a deteriorated state of the HC adsorbent 12 may be evaluated based on either one of the above quantities or the results of evaluations based on the above quantities may be combined to evaluate a deteriorated state of the HC adsorbent 12. For example, the results of evaluations based on the above quantities hc/trp, shc/trp, dtrs, and shc/prg may be employed as preliminary results, and the HC adsorbent 12 may be judged as being deteriorated if two or more of the preliminary results indicate that the HC adsorbent 12 is deteriorated.

In the above embodiment, it is decided whether the HC adsorbent 12 is deteriorated or not. However, the progress of deterioration of the HC adsorbent 12 may be divided into a plurality of stages for evaluation. In this case, each of the instantaneous adsorbed amount hc/trp, the integrated adsorbed amount shc/trp, the adsorption completion time dtrs, and the integrated desorbed amount shc/prg may be compared with a plurality of thresholds set in the respective stages of the progress of deterioration of the HC adsorbent 12.

In the above embodiment, the air-fuel ratio sensors 28, 29 are used as exhaust gas sensors for generating outputs depending on the HC concentration in the exhaust gas. However, an $O_2$ sensor, an HC sensor, etc. may be used instead of the air-fuel ratio sensors 28, 29.

In the above embodiment, the temperature sensor 30 is used to recognize the temperature of the HC adsorbent 12, i.e., the adsorbent temperature Ttrs. However, the temperature of the HC adsorbent 12 may be estimated based on the intake pressure PB, the rotational speed NE, the engine temperature TW, the after-engine-start elapsed time tm/trs, or a pre-constructed model. Alternatively, in a situation where the temperature sensor 30 is not activated, an estimated value of the adsorbent temperature Ttrs may be used, and after the temperature sensor 30 is activated, a detected value produced by the temperature sensor 30 may be used.

In the above embodiment, the adsorbent temperature Ttrs is substituted for the temperature of the catalytic converter 11 for determining the corrective coefficient k/itacat using the data table shown in FIG. 9 and the exhaust gas temperature for determining the corrective coefficient k/hc using the data table shown in FIG. 10, i.e., the temperature of the exhaust gas having passed through the catalytic converter 11 and flowing into the exhaust gas adsorption unit 13. However, these temperatures may be directly detected by respective temperature sensors, or may be estimated based on the intake pressure PB, the rotational speed NE, the engine temperature TW, the after-engine-start elapsed time tm/trs, or a pre-constructed model.

In the above embodiment, when the adsorbed HC is desorbed from the HC adsorbent 12, the exhaust gas containing the desorbed HC is recirculated to the intake pipe 7 and combusted in the combustion chamber 4 of the internal combustion engine 1. However, the exhaust gas containing the HC desorbed from the HC adsorbent 12 may be recirculated to a location upstream of the catalytic converter 11 after the catalytic converter 11 is activated, and purified by the catalytic converter 11.

In the above embodiment, the present invention is applied to the evaluation of a deteriorated state of the HC adsorbent 12. However, the principles of the present invention are also applicable to the evaluation of a deteriorated state of an adsorbent for adsorbing a gas component such as NOx or the like.

Although a certain preferred embodiment of the present invention have been shown and described in detail, it should be understood that various changes and modifications may be made therein without departing from the scope of the appended claims.

What is claimed is:

1. A method of evaluating a deteriorated state of an exhaust gas adsorbent disposed in an exhaust passage supplied with an exhaust gas emitted from an internal combustion engine, said exhaust gas adsorbent being operable alternatively in an adsorption mode for adsorbing a particular component of the exhaust gas and a desorption mode for desorbing the adsorbed component depending on an environmental condition at the time said exhaust gas is supplied to the exhaust passage, comprising the steps of:

providing a first exhaust gas sensor and a second exhaust gas sensor for generating respective outputs depending on the concentration of said particular component, respectively upstream and downstream of said exhaust gas adsorbent;

adsorbing said particular component with said exhaust gas adsorbent in said adsorption mode while supplying the exhaust gas from said internal combustion engine to said exhaust passage;

calculating an amount of said particular component which has been adsorbed by said exhaust gas adsorbent per unit time, based on the difference between the outputs of said first and second exhaust gas sensors which is obtained while said particular component is being adsorbed by said exhaust gas adsorbent;

evaluating a deteriorated state of said exhaust gas adsorbent using the calculated adsorbed amount of said particular component; and wherein said step of calculating the adsorbed amount of said particular component comprises the step of converting the difference between the outputs of said first and second exhaust gas sensors depending on a flow rate of the exhaust gas flowing in said exhaust passage when the outputs of said first and second exhaust gas sensors are obtained, and a temperature of said exhaust gas, for thereby determining the adsorbed amount of said particular component.

2. A method according to claim 1, wherein said step of evaluating a deteriorated state of said exhaust gas adsorbent comprises the step of comparing the calculated adsorbed amount of said particular component with a predetermined threshold to evaluate a deteriorated state of said exhaust gas adsorbent.

3. A method according to claim 1, wherein said step of calculating the adsorbed amount of said particular component comprises the step of successively determining the adsorbed amount of said particular component while said step of calculating an adsorbed amount of said particular component is being carried out, and said step of evaluating a deteriorated state of said exhaust gas adsorbent comprises the steps of integrating said calculated adsorbed amount for a predetermined period while said step of adsorbing said particular component is being carried out, thereby to determine an integrated adsorbed amount of said particular component adsorbed by said exhaust gas adsorbent in said predetermined period, and comparing said integrated adsorbed amount with a predetermined threshold thereby to evaluate a deteriorated state of said exhaust gas adsorbent.

4. A method according to claim 1, wherein said step of calculating the adsorbed amount of said particular component comprises the step of successively determining the adsorbed amount of said particular component while said step of calculating an adsorbed amount of said particular component is being carried out, and said step of evaluating a deteriorated state of said exhaust gas adsorbent comprises the steps of measuring an elapsed time required from the start of said step of adsorbing said particular component until said successively determined adsorbed amount of said particular component drops to or below a predetermined amount, and comparing the measured elapsed time with a predetermined threshold thereby to evaluate a deteriorated state of said exhaust gas adsorbent.

5. A method according to claim 1, wherein said predetermined period comprises a period in which said adsorbed amount calculated from the start of said step of adsorbing said particular component drops to or below a predetermined amount, or a period in which a predetermined time elapses from the start of said step of adsorbing said particular component.

6. A method of evaluating a deteriorated state of an exhaust gas adsorbent disposed in an exhaust passage supplied with an exhaust gas emitted from an internal combustion engine, said exhaust gas adsorbent being operable alternatively in an adsorption mode for adsorbing a particular component of the exhaust gas and a desorption mode for desorbing the adsorbed component depending on an environmental condition at the time said exhaust gas is supplied to the exhaust passage, comprising the steps of:

providing a first exhaust gas sensor and a second exhaust gas sensor for generating respective outputs depending on the concentration of said particular component, respectively upstream and downstream of said exhaust gas adsorbent;

adsorbing said particular component with said exhaust gas adsorbent in said adsorption mode while supplying the exhaust gas from said internal combustion engine to said exhaust passage;

calculating an amount of said particular component which has been adsorbed by said exhaust gas adsorbent per unit time, based on the difference between the outputs of said first and second exhaust gas sensors which is obtained while said particular component is being adsorbed by said exhaust gas adsorbent; evaluating a deteriorated state of said exhaust gas adsorbent using the calculated adsorbed amount of said particular component; and wherein said step of calculating the adsorbed amount of said particular component comprises the step of successively determining the adsorbed amount of said particular component while said step of calculating an adsorbed amount of said particular component is being carried out, and said step of evaluating a deteriorated state of said exhaust gas adsorbent comprises the steps of measuring an elapsed time required from the start of said step of adsorbing said particular component until said successively determined adsorbed amount of said particular component drops to or below a predetermined amount, and comparing the measured elapsed time with a predetermined threshold thereby to evaluate a deteriorated state of said exhaust gas adsorbent.

7. A method of evaluating a deteriorated state of an exhaust gas adsorbent disposed in an exhaust passage supplied with an exhaust gas emitted from an internal combustion engine, said exhaust gas adsorbent being operable alternatively in an adsorption mode for adsorbing a particular component of the exhaust gas and a desorption mode for desorbing the adsorbed component depending on an environmental condition at the time said exhaust gas is supplied to the exhaust passage, comprising the steps of:

providing a first exhaust gas sensor and a second exhaust gas sensor for generating respective outputs depending on the concentration of said particular component, respectively upstream and downstream of said exhaust gas adsorbent;

adsorbing said particular component with said exhaust gas adsorbent in said adsorption mode while supplying the exhaust gas from said internal combustion engine to said exhaust passage;

calculating an amount of said particular component which has been adsorbed by said exhaust gas adsorbent per unit time, based on the difference between the outputs of said first and second exhaust gas sensors which is obtained while said particular component is being adsorbed by said exhaust gas adsorbent;

evaluating a deteriorated state of said exhaust gas adsorbent using the calculated adsorbed amount of said particular component;

wherein said step of calculating the adsorbed amount of said particular component comprises the step of successively determining the adsorbed amount of said particular component while said step of calculating an adsorbed amount of said particular component is being carried out, and said step of evaluating a deteriorated state of said exhaust gas adsorbent comprises the steps of integrating said calculated adsorbed amount for a predetermined period while said step of adsorbing said particular component is being carried out, thereby to determine an integrated adsorbed amount of said particular component adsorbed by said exhaust gas adsorbent in said predetermined period, and comparing said integrated adsorbed amount with a predetermined threshold thereby to evaluate a deteriorated state of said exhaust gas adsorbent; and wherein said predetermined period comprises a period in which said adsorbed amount calculated from the start of said step of adsorbing said particular component drops to or below a predetermined amount, or a period in which a predetermined time elapses from the start of said step of adsorbing said particular component.

8. A method of evaluating a deteriorated state of an exhaust gas adsorbent disposed in an exhaust passage supplied with an exhaust gas emitted from an internal combustion engine, said exhaust gas adsorbent being operable alternatively in an adsorption mode for adsorbing a particular component of the exhaust gas and a desorption mode for desorbing the adsorbed component depending on an environmental condition at the time said exhaust gas is supplied to the exhaust passage, comprising the steps of:

providing a first exhaust gas sensor and a second exhaust gas sensor for generating respective outputs depending on the concentration of said particular component, respectively upstream and downstream of said exhaust gas adsorbent;

adsorbing said particular component with said exhaust gas adsorbent in said adsorption mode while supplying the exhaust gas from said internal combustion engine to said exhaust passage for a predetermined period;

thereafter, desorbing said particular component from said exhaust gas adsorbent in said desorption mode while supplying the exhaust gas from said internal combustion engine to said exhaust passage;

successively calculating an amount of said particular component which has been desorbed from said exhaust gas adsorbent per unit time, based on the difference between the outputs of said first and second exhaust gas sensors which is obtained while said particular component is being desorbed from said exhaust gas adsorbent;

integrating the desorbed amount of said particular component from the start of said step of desorbing said particular component from said exhaust gas adsorbent until the calculated desorbed amount of said particular component becomes substantially nil, thereby to determine an integrated desorbed amount of said particular component desorbed from said exhaust gas adsorbent in said step of desorbing said particular component; and comparing said integrated desorbed amount with a predetermined threshold thereby to evaluate a deteriorated state of said exhaust gas adsorbent.

9. A method according to claim 8, wherein said step of calculating the desorbed amount of said particular comprises the step of converting the difference between the outputs of said first and second exhaust gas sensors depending on a flow rate of the exhaust gas flowing in said exhaust passage when the outputs of said first and second exhaust gas sensors are obtained, and a temperature of said exhaust gas, for thereby determining the desorbed amount of said particular component.

10. A method according to any one of claims 1, 9, 4 or 5, wherein said predetermined threshold is set depending on at least a temperature of said exhaust gas adsorbent.

11. A method according to any one of claims 2–8, or further comprising the steps of:

constructing a model which expresses the output per predetermined control cycle of said second exhaust gas sensor, with a plurality of time-series data in a previous control cycle of the output of said first exhaust gas sensor, coefficient parameters relative to the time-series data, respectively, of said first exhaust gas sensor, and a monomial parameter independent of the time-series data of said first exhaust gas sensor;

successively identifying values of said coefficient parameters and said monomial parameter based on the outputs of said first and second exhaust gas sensors while said step of adsorbing said particular component is being carried out; and successively estimating the output of said second exhaust gas sensor using the identified values of said coefficient parameters and said monomial parameter based on said model;

said step of calculating the desorbed amount of said particular component comprising the step of determining said desorbed amount using the difference between the output of said first exhaust gas sensor and the estimated output of said second exhaust gas sensor instead of the difference between the outputs of said first and second exhaust gas sensors.

12. A method according to claim 11, wherein said step of identifying values of said coefficient parameters and said monomial parameter comprises the step of identifying values of said coefficient parameters and said monomial parameter according to an algorithm constructed to minimize an error between the value of the output of said second exhaust gas sensor which is determined from the time-series data of the output of said first exhaust gas sensor based on said model and the value of the actual output of said second exhaust gas sensor.

13. A method of evaluating a deteriorated state of an exhaust gas adsorbent disposed in an exhaust passage supplied with an exhaust gas emitted from an internal combustion engine, said exhaust gas adsorbent being operable alternatively in an adsorption mode for adsorbing a particular component of the exhaust gas and a desorption mode for desorbing the adsorbed component depending on an environmental condition at the time said exhaust gas is supplied to the exhaust passage, comprising the steps of:

providing a first exhaust gas sensor and a second exhaust gas sensor for generating respective outputs depending on the concentration of said particular component, respectively upstream and downstream of said exhaust gas adsorbent;

adsorbing said particular component with said exhaust gas adsorbent in said adsorption mode while supplying the exhaust gas from said internal combustion engine to said exhaust passage;

calculating an amount of said particular component which has been adsorbed by said exhaust gas adsorbent per unit time, based on the difference between the outputs of said first and second exhaust gas sensors which is obtained while said particular component is being adsorbed by said exhaust gas adsorbent;

evaluating a deteriorated state of said exhaust gas adsorbent using the calculated adsorbed amount of said particular component;

wherein said step of evaluating a deteriorated state of said exhaust gas adsorbent comprises the step of comparing the calculated adsorbed amount of said particular component with a predetermined threshold to evaluate a deteriorated state of said exhaust gas adsorbent; and wherein said predetermined threshold is set depending on at least a temperature of said exhaust gas adsorbent.

14. A method of evaluating a deteriorated state of an exhaust gas adsorbent disposed in an exhaust passage supplied with an exhaust gas emitted from an internal combustion engine, said exhaust gas adsorbent being operable alternatively in an adsorption mode for adsorbing a particular component of the exhaust gas and a desorption mode for desorbing the adsorbed component depending on an environmental condition at the time said exhaust gas is supplied to the exhaust passage, comprising the steps of:

providing a first exhaust gas sensor and a second exhaust gas sensor for generating respective outputs depending on the concentration of said particular component, respectively upstream and downstream of said exhaust gas adsorbent;

adsorbing said particular component with said exhaust gas adsorbent in said adsorption mode while supplying the exhaust gas from said internal combustion engine to said exhaust passage;

calculating an amount of said particular component which has been adsorbed by said exhaust gas adsorbent per unit time, based on the difference between the outputs of said first and second exhaust gas sensors which is obtained while said particular component is being adsorbed by said exhaust gas adsorbent;

evaluating a deteriorated state of said exhaust gas adsorbent using the calculated adsorbed amount of said particular component;

wherein said step of calculating the adsorbed amount of said particular component comprises the step of successively determining the adsorbed amount of said particular component while said step of calculating an adsorbed amount of said particular component is being carried out, and said step of evaluating a deteriorated state of said exhaust gas adsorbent comprises the steps of measuring an elapsed time required from the start of said step of adsorbing said particular component until said successively determined adsorbed amount of said particular component drops to or below a predetermined amount, and comparing the measured elapsed time with a predetermined threshold thereby to evaluate a deteriorated state of said exhaust gas adsorbent; and wherein said predetermined threshold is set depending on at least a temperature of said exhaust gas adsorbent.

15. A method of evaluating a deteriorated state of an exhaust gas adsorbent disposed in an exhaust passage supplied with an exhaust gas emitted from an internal combustion engine, said exhaust gas adsorbent being operable alternatively in an adsorption mode for adsorbing a particular component of the exhaust gas and a desorption mode for desorbing the adsorbed component depending on an environmental condition at the time said exhaust gas is supplied to the exhaust passage, comprising the steps of:

providing a first exhaust gas sensor and a second exhaust gas sensor for generating respective outputs depending on the concentration of said particular component, respectively upstream and downstream of said exhaust gas adsorbent;

adsorbing said particular component with said exhaust gas adsorbent in said adsorption mode while supplying the exhaust gas from said internal combustion engine to said exhaust passage;

calculating an amount of said particular component which has been adsorbed by said exhaust gas adsorbent per unit time, based on the difference between the outputs of said first and second exhaust gas sensors which is obtained while said particular component is being adsorbed by said exhaust gas adsorbent;

evaluating a deteriorated state of said exhaust gas adsorbent using the calculated adsorbed amount of said particular component;

wherein said step of calculating the adsorbed amount of said particular component comprises the step of successively determining the adsorbed amount of said particular component while said step of calculating an adsorbed amount of said particular component is being carried out, and said step of evaluating a deteriorated state of said exhaust gas adsorbent comprises the steps of integrating said calculated adsorbed amount for a predetermined period while said step of adsorbing said particular component is being carried out, thereby to determine an integrated adsorbed amount of said particular component adsorbed by said exhaust gas adsorbent in said predetermined period, and comparing said integrated adsorbed amount with a predetermined threshold thereby to evaluate a deteriorated state of said exhaust gas adsorbent; and wherein said predetermined threshold is set depending on at least a temperature of said exhaust gas adsorbent.

16. A method of evaluating a deteriorated state of an exhaust gas adsorbent disposed in an exhaust passage supplied with an exhaust gas emitted from an internal combustion engine, said exhaust gas adsorbent being operable alternatively in an adsorption mode for adsorbing a particular component of the exhaust gas and a desorption mode for desorbing the adsorbed component depending on an environmental condition at the time said exhaust gas is supplied to the exhaust passage, comprising the steps of:

providing a first exhaust gas sensor and a second exhaust gas sensor for generating respective outputs depending on the concentration of said particular component, respectively upstream and downstream of said exhaust gas adsorbent;

adsorbing said particular component with said exhaust gas adsorbent in said adsorption mode while supplying the exhaust gas from said internal combustion engine to said exhaust passage;

calculating an amount of said particular component which has been adsorbed by said exhaust gas adsorbent per unit time, based on the difference between the outputs of said first and second exhaust gas sensors which is obtained while said particular component is being adsorbed by said exhaust gas adsorbent;

evaluating a deteriorated state of said exhaust gas adsorbent using the calculated adsorbed amount of said particular component;

constructing a model which expresses the output per predetermined control cycle of said second exhaust gas sensor, with a plurality of time-series data in a previous control cycle of the output of said first exhaust gas sensor, coefficient parameters relative to the time-series data, respectively, of said first exhaust gas sensor, and a monomial parameter independent of the time-series data of said first exhaust gas sensor;

successively identifying values of said coefficient parameters and said monomial parameter based on the outputs of said first and second exhaust gas sensors while said step of adsorbing said particular component is being carried out;

successively estimating the output of said second exhaust gas sensor using the identified values of said coefficient parameters and said monomial parameter based on said model; and wherein said step of calculating the adsorbed amount of said particular component comprises the step of determining said adsorbed amount using the difference between the output of said first exhaust gas sensor and the estimated output of said second exhaust gas sensor instead of the difference between the outputs of said first and second exhaust gas sensors.

17. A method according to claim 16, wherein said step of identifying values of said coefficient parameters and said monomial parameter comprises the step of identifying values of said coefficient parameters and said monomial parameter according to an algorithm constructed to minimize an error between the value of the output of said second exhaust gas sensor which is determined from the time-series data of the output of said first exhaust gas sensor based on said model and the value of the actual output of said second exhaust gas sensor.

18. A method of evaluating a deteriorated state of an exhaust gas adsorbent disposed in an exhaust passage supplied with an exhaust gas emitted from an internal combustion engine, said exhaust gas adsorbent being operable alternatively in an adsorption mode for adsorbing a particular component of the exhaust gas and a desorption mode for desorbing the adsorbed component depending on an environmental condition at the time said exhaust gas is supplied to the exhaust passage, comprising the steps of:

providing a first exhaust gas sensor and a second exhaust gas sensor for generating respective outputs depending on the concentration of said particular component, respectively upstream and downstream of said exhaust gas adsorbent;

adsorbing said particular component with said exhaust gas adsorbent in said adsorption mode while supplying the exhaust gas from said internal combustion engine to said exhaust passage;

calculating an amount of said particular component which has been adsorbed by said exhaust gas adsorbent per unit time, based on the difference between the outputs of said first and second exhaust gas sensors which is obtained while said particular component is being adsorbed by said exhaust gas adsorbent;

evaluating a deteriorated state of said exhaust gas adsorbent using the calculated adsorbed amount of said particular component;

wherein said step of evaluating a deteriorated state of said exhaust gas adsorbent comprises the step of comparing the calculated adsorbed amount of said particular component with a predetermined threshold to evaluate a deteriorated state of said exhaust gas adsorbent; and constructing a model which expresses the output per predetermined control cycle of said second exhaust gas sensor, with a plurality of time-series data in a previous control cycle of the output of said first exhaust gas sensor, coefficient parameters relative to the time-series data, respectively, of said first exhaust gas sensor, and a monomial parameter independent of the time-series data of said first exhaust gas sensor;

successively identifying values of said coefficient parameters and said monomial parameter based on the outputs of said first and second exhaust gas sensors while said step of adsorbing said particular component is being carried out; and successively estimating the output of said second exhaust gas sensor using the identified values of said coefficient parameters and said monomial parameter based on said model; and wherein said step of calculating the adsorbed amount of said particular component comprises the step of determining said adsorbed amount using the difference between the output of said first exhaust gas sensor and the estimated output of said second exhaust gas sensor instead of the difference between the outputs of said first and second exhaust gas sensors.

19. A method according to claim 18, wherein said step of identifying values of said coefficient parameters and said monomial parameter comprises the step of identifying values of said coefficient parameters and said monomial parameter according to an algorithm constructed to minimize an error between the value of the output of said second exhaust gas sensor which is determined from the time-series data of the output of said first exhaust gas sensor based on said model and the value of the actual output of said second exhaust gas sensor.

20. A method of evaluating a deteriorated state of an exhaust gas adsorbent disposed in an exhaust passage supplied with an exhaust gas emitted from an internal combustion engine, said exhaust gas adsorbent being operable alternatively in an adsorption mode for adsorbing a particular component of the exhaust gas and a desorption mode for desorbing the adsorbed component depending on an environmental condition at the time said exhaust gas is supplied to the exhaust passage, comprising the steps of:

providing a first exhaust gas sensor and a second exhaust gas sensor for generating respective outputs depending on the concentration of said particular component, respectively upstream and downstream of said exhaust gas adsorbent;

adsorbing said particular component with said exhaust gas adsorbent in said adsorption mode while supplying the exhaust gas from said internal combustion engine to said exhaust passage;

calculating an amount of said particular component which has been adsorbed by said exhaust gas adsorbent per unit time, based on the difference between the outputs of said first and second exhaust gas sensors which is obtained while said particular component is being adsorbed by said exhaust gas adsorbent;

evaluating a deteriorated state of said exhaust gas adsorbent using the calculated adsorbed amount of said particular component;

wherein said step of calculating the adsorbed amount of said particular component comprises the step of successively determining the adsorbed amount of said particular component while said step of calculating an adsorbed amount of said particular component is being carried out, and said step of evaluating a deteriorated state of said exhaust gas adsorbent comprises the steps of measuring an elapsed time required from the start of said step of adsorbing said particular component until said successively determined adsorbed amount of said particular component drops to or below a predetermined amount, and comparing the measured elapsed time with a predetermined threshold thereby to evaluate a deteriorated state of said exhaust gas adsorbent; and constructing a model which expresses the output per predetermined control cycle of said second exhaust gas sensor, with a plurality of time-series data in a previous control cycle of the output of said first exhaust gas sensor, coefficient parameters relative to the time-series data, respectively, of said first exhaust gas sensor, and a monomial parameter independent of the time-series data of said first exhaust gas sensor;

successively identifying values of said coefficient parameters and said monomial parameter based on the outputs of said first and second exhaust gas sensors while said step of adsorbing said particular component is being carried out;

successively estimating the output of said second exhaust gas sensor using the identified values of said coefficient parameters and said monomial parameter based on said model; and wherein said step of calculating the adsorbed amount of said particular component comprises the step of determining said adsorbed amount using the difference between the output of said first exhaust gas sensor and the estimated output of said second exhaust gas sensor instead of the difference between the outputs of said first and second exhaust gas sensors.

21. A method according to claim 20, wherein said step of identifying values of said coefficient parameters and said monomial parameter comprises the step of identifying values of said coefficient parameters and said monomial parameter according to an algorithm constructed to minimize an error between the value of the output of said second exhaust gas sensor which is determined from the time-series data of the output of said first exhaust gas sensor based on said model and the value of the actual output of said second exhaust gas sensor.

22. A method of evaluating a deteriorated state of an exhaust gas adsorbent disposed in an exhaust passage supplied with an exhaust gas emitted from an internal combustion engine, said exhaust gas adsorbent being operable alternatively in an adsorption mode for adsorbing a particular component of the exhaust gas and a desorption mode for desorbing the adsorbed component depending on an environmental condition at the time said exhaust gas is supplied to the exhaust passage, comprising the steps of:

providing a first exhaust gas sensor and a second exhaust gas sensor for generating respective outputs depending on the concentration of said particular component, respectively upstream and downstream of said exhaust gas adsorbent;

adsorbing said particular component with said exhaust gas adsorbent in said adsorption mode while supplying the exhaust gas from said internal combustion engine to said exhaust passage;

calculating an amount of said particular component which has been adsorbed by said exhaust gas adsorbent per unit time, based on the difference between the outputs of said first and second exhaust gas sensors which is obtained while said particular component is being adsorbed by said exhaust gas adsorbent;

evaluating a deteriorated state of said exhaust gas adsorbent using the calculated adsorbed amount of said particular component; and wherein said step of calculating the adsorbed amount of said particular component comprises the step of successively determining the adsorbed amount of said particular component while said step of calculating an adsorbed amount of said particular component is being carried out, and said step of evaluating a deteriorated state of said exhaust gas adsorbent comprises the steps of integrating said calculated adsorbed amount for a predetermined period while said step of adsorbing said particular component is being carried out, thereby to determine an integrated adsorbed amount of said particular component adsorbed by said exhaust gas adsorbent in said predetermined period, and comparing said integrated adsorbed amount with a predetermined threshold thereby to evaluate a deteriorated state of said exhaust gas adsorbent; and constructing a model which expresses the output per predetermined control cycle of said second exhaust gas sensor, with a plurality of time-series data in a previous control cycle of the output of said first exhaust gas sensor, coefficient parameters relative to the time-series data, respectively, of said first exhaust gas sensor, and a monomial parameter independent of the time-series data of said first exhaust gas sensor;

successively identifying values of said coefficient parameters and said monomial parameter based on the outputs of said first and second exhaust gas sensors while said step of adsorbing said particular component is being carried out; and successively estimating the output of said second exhaust gas sensor using the identified values of said coefficient parameters and said monomial parameter based on said model; and wherein said step of calculating the adsorbed amount of said particular component comprises the step of determining said adsorbed amount using the difference between the output of said first exhaust gas sensor and the estimated output of said second exhaust gas sensor instead of the difference between the outputs of said first and second exhaust gas sensors.

23. A method according to claim 22, wherein said step of identifying values of said coefficient parameters and said monomial parameter comprises the step of identifying values of said coefficient parameters and said monomial parameter according to an algorithm constructed to minimize an error between the value of the output of said second exhaust gas sensor which is determined from the time-series data of the output of said first exhaust gas sensor based on said model and the value of the actual output of said second exhaust gas sensor.

* * * * *